US012564117B2

(12) United States Patent
Zielke et al.

(10) Patent No.: US 12,564,117 B2
(45) Date of Patent: Mar. 3, 2026

(54) DEVICES, SYSTEMS, AND METHODS FOR SEED TRENCH PROTECTION

(71) Applicant: Ag Leader Technology, Ames, IA (US)

(72) Inventors: Roger Zielke, Huxley, IA (US); Tony Woodcock, Ames, IA (US); Scott Eichhorn, Ames, IA (US); Brett Buehler, Dallas Center, IA (US); Bob Heston, Madrid, IA (US); Joe Holoubek, Ames, IA (US); Jonathan Brand, Ames, IA (US)

(73) Assignee: Ag Leader Technology, Ames, IA (US)

( * ) Notice: Subject to any disclaimer, the term of this patent is extended or adjusted under 35 U.S.C. 154(b) by 886 days.

(21) Appl. No.: 17/679,757

(22) Filed: Feb. 24, 2022

(65) Prior Publication Data

US 2022/0174855 A1 Jun. 9, 2022

Related U.S. Application Data

(62) Division of application No. 16/371,815, filed on Apr. 1, 2019, now abandoned.

(Continued)

(51) Int. Cl.
| | |
|---|---|
| *A01B 49/06* | (2006.01) |
| *A01B 49/02* | (2006.01) |
| *A01C 5/06* | (2006.01) |

(52) U.S. Cl.
CPC ............ *A01B 49/06* (2013.01); *A01B 49/027* (2013.01); *A01C 5/064* (2013.01); *A01C 5/066* (2013.01)

(58) Field of Classification Search
CPC ......... A01B 49/06; A01B 49/04; A01B 49/00; A01B 49/02; A01B 49/027; A01C 5/064;
(Continued)

(56) References Cited

U.S. PATENT DOCUMENTS

| | | |
|---|---|---|
| 54,633 A | 5/1866 | Wilkinson |
| 605,348 A | 6/1898 | Schultz |

(Continued)

FOREIGN PATENT DOCUMENTS

| | | |
|---|---|---|
| AU | 2006203367 A1 | 2/2007 |
| AU | 2010201330 A1 | 3/2011 |

(Continued)

OTHER PUBLICATIONS

Operating Manual for the Ag Leader Integra, Part No. 4002083, p. 130 of version 5.2.

(Continued)

*Primary Examiner* — Christopher J. Novosad
(74) *Attorney, Agent, or Firm* — DENTONS DAVIS BROWN PC; Matthew Warner-Blankenship; Kassandra Ricklefs

(57) ABSTRACT

Protecting open seed trenches from ingress of foreign material, such as plant residue. Preventing foreign material from entering the open seed trench during planting increases crop yield by minimizing delayed germination and late plant emergence. Various implementations of adjustable row cleaners may be used to prevent ingress of foreign material. Also, various shields may be disposed on the row units of a planter to prevent ingress of foreign material.

18 Claims, 21 Drawing Sheets

Related U.S. Application Data

(60) Provisional application No. 62/650,779, filed on Mar. 30, 2018.

(58) Field of Classification Search
CPC .. A01C 5/062; A01C 5/06; A01C 5/00; A01C 5/066
See application file for complete search history.

(56) References Cited

U.S. PATENT DOCUMENTS

| | | | |
|---|---|---|---|
| 1,178,765 A | 4/1916 | Waterman | |
| 1,252,923 A | 1/1918 | Moench | |
| 1,678,643 A | 7/1928 | Kassebeer | |
| 1,731,356 A | 10/1929 | Smith | |
| 2,357,760 A | 9/1944 | Peacock | |
| 2,525,435 A | 10/1950 | White | |
| 3,233,523 A | 2/1966 | Passaggio | |
| 3,463,010 A | 8/1969 | Hatschek | |
| 3,509,837 A | 5/1970 | Erickson | |
| 3,718,191 A | 2/1973 | Williams | |
| 3,749,035 A | 7/1973 | Cayton | |
| 3,797,418 A | 3/1974 | Bridger | |
| 3,844,357 A | 10/1974 | Ellinger | |
| 4,116,139 A | 9/1978 | Sauer | |
| 4,167,910 A | 9/1979 | Pretzer | |
| 4,193,458 A | 3/1980 | Long | |
| 4,209,109 A | 6/1980 | Cur | |
| 4,329,911 A | 5/1982 | Schwerin | |
| 4,359,104 A | 11/1982 | Haapala | |
| 4,417,530 A | 11/1983 | Kopecky | |
| 4,596,200 A | 6/1986 | Gafford | |
| 4,646,663 A | 3/1987 | Nikkel | |
| 4,655,296 A | 4/1987 | Bourgault | |
| 4,700,785 A | 10/1987 | Bartusek | |
| 4,765,423 A | 8/1988 | Karpa | |
| 4,796,550 A | 1/1989 | Van Natta | |
| 4,865,132 A | 9/1989 | Moore | |
| 4,878,443 A | 11/1989 | Gardner | |
| 4,913,070 A | 4/1990 | Morrison | |
| 4,949,656 A | 8/1990 | Lyle | |
| 4,986,782 A | 1/1991 | Severtson | |
| 5,065,681 A | 11/1991 | Hadley | |
| 5,069,779 A | 12/1991 | Brown | |
| 5,074,227 A | 12/1991 | Schwitters | |
| 5,103,924 A | 4/1992 | Walker | |
| 5,163,518 A | 11/1992 | Foley | |
| 5,170,909 A | 12/1992 | Lundle | |
| 5,234,060 A | 8/1993 | Carter | |
| 5,277,257 A | 1/1994 | Thompson | |
| 5,366,024 A | 11/1994 | Payne | |
| 5,425,318 A | 6/1995 | Keeton | |
| 5,427,182 A | 6/1995 | Winter | |
| 5,479,992 A | 1/1996 | Bassett | |
| 5,497,837 A | 3/1996 | Kehrney | |
| 5,499,683 A | 3/1996 | Bassett | |
| 5,529,128 A | 6/1996 | Peterson | |
| 5,664,507 A | 9/1997 | Bergland | |
| 5,709,271 A | 1/1998 | Bassett | |
| 5,829,535 A | 11/1998 | Line | |
| 5,842,428 A | 12/1998 | Stufflebeam et al. | |
| 5,862,764 A | 1/1999 | Umemoto | |
| 5,936,234 A | 8/1999 | Thomas | |
| 5,961,573 A | 10/1999 | Hale | |
| 6,003,455 A | 12/1999 | Flamme | |
| 6,013,020 A | 1/2000 | Meloul | |
| 6,068,063 A | 5/2000 | Mayerle | |
| 6,068,064 A | 5/2000 | Bettin | |
| 6,091,997 A | 7/2000 | Flamme | |
| 6,116,172 A | 9/2000 | Prairie | |
| 6,119,608 A | 9/2000 | Peterson | |
| 6,325,156 B1 | 12/2001 | Barry | |
| 6,378,619 B2 | 4/2002 | Mayerle | |
| 6,389,999 B1 | 5/2002 | Duello | |
| 6,460,623 B1 | 10/2002 | Knussman | |
| 6,681,706 B2 | 1/2004 | Sauder et al. | |
| 6,701,857 B1 | 3/2004 | Jensen | |
| 6,748,885 B2 | 6/2004 | Sauder et al. | |
| 6,827,029 B1 | 12/2004 | Wendte | |
| 6,863,006 B2 | 3/2005 | Sandoval | |
| 7,131,384 B2 | 11/2006 | Kester | |
| 7,263,937 B2 | 9/2007 | Frasier | |
| 7,334,532 B2 | 2/2008 | Sauder et al. | |
| 7,395,767 B2 | 7/2008 | Sulman | |
| 7,395,769 B2 | 7/2008 | Jensen | |
| 7,478,603 B2 | 1/2009 | Riewerts | |
| 7,493,836 B2 | 2/2009 | Wolfer | |
| 7,540,246 B2 | 6/2009 | Friesen | |
| 7,584,707 B2 | 9/2009 | Sauder | |
| 7,673,570 B1 | 3/2010 | Bassett | |
| 7,694,638 B1 | 4/2010 | Riewerts | |
| 7,699,009 B2 | 4/2010 | Sauder et al. | |
| 7,717,048 B2 | 5/2010 | Peterson, Jr. et al. | |
| 7,870,826 B2 | 1/2011 | Bourgault | |
| 7,938,074 B2 | 5/2011 | Liu | |
| 7,980,186 B2 | 7/2011 | Henry | |
| 8,020,657 B2 | 9/2011 | Allard | |
| 8,056,465 B2 | 11/2011 | Carlz | |
| 8,078,367 B2 | 12/2011 | Sauder | |
| 8,201,507 B2 | 6/2012 | Sauder | |
| 8,275,525 B2 | 9/2012 | Kowalchuk | |
| 8,275,627 B2 | 9/2012 | Henning | |
| 8,286,566 B2 | 10/2012 | Schilling | |
| 8,342,258 B2 | 1/2013 | Ryder | |
| 8,346,442 B2 | 1/2013 | Ryder | |
| 8,371,239 B2 | 2/2013 | Rans et al. | |
| 8,418,636 B2 | 4/2013 | Liu et al. | |
| 8,430,179 B2 | 4/2013 | Van Buskirk | |
| 8,448,587 B2 | 5/2013 | Kowalchuk | |
| 8,448,717 B2 | 5/2013 | Adams et al. | |
| 8,451,449 B2 | 5/2013 | Holland | |
| 8,479,671 B2 | 7/2013 | Shoup | |
| 8,522,889 B2 | 9/2013 | Adams et al. | |
| 8,544,397 B2 | 10/2013 | Bassett | |
| 8,544,398 B2 | 10/2013 | Bassett | |
| 8,550,020 B2 * | 10/2013 | Sauder | F15B 11/042 |
| | | | 701/50 |
| 8,561,472 B2 | 10/2013 | Sauder et al. | |
| 8,573,111 B2 | 11/2013 | Graham | |
| 8,634,992 B2 | 1/2014 | Sauder et al. | |
| 8,636,077 B2 | 1/2014 | Bassett | |
| 8,755,049 B2 | 6/2014 | Holland | |
| 8,763,713 B2 | 7/2014 | Bassett | |
| 8,770,308 B2 | 7/2014 | Bassett | |
| 8,776,702 B2 | 7/2014 | Bassett | |
| RE45,091 E | 8/2014 | Bassett | |
| 8,814,474 B2 | 8/2014 | Bell | |
| 8,850,998 B2 | 10/2014 | Garner | |
| 8,863,857 B2 | 10/2014 | Bassett | |
| 8,903,545 B2 | 12/2014 | Riffel | |
| 8,909,436 B2 | 12/2014 | Achen | |
| 8,910,582 B2 | 12/2014 | Mariman et al. | |
| 8,924,092 B2 | 12/2014 | Achen | |
| 8,924,102 B2 | 12/2014 | Sauder et al. | |
| RE45,412 E | 3/2015 | Sauder et al. | |
| 8,978,564 B2 | 3/2015 | Hagny | |
| 8,985,037 B2 | 3/2015 | Radtke | |
| 8,985,232 B2 | 3/2015 | Bassett | |
| 9,055,712 B2 | 6/2015 | Bassett | |
| 9,107,337 B2 | 8/2015 | Bassett | |
| 9,107,338 B2 | 8/2015 | Bassett | |
| 9,113,589 B2 | 8/2015 | Bassett | |
| 9,119,342 B2 | 9/2015 | Bonefas | |
| 9,137,938 B2 | 9/2015 | Zimmerman | |
| 9,144,187 B2 | 9/2015 | Bassett | |
| 9,144,189 B2 | 9/2015 | Stoller | |
| 9,167,740 B2 | 10/2015 | Bassett | |
| 9,173,339 B2 | 11/2015 | Sauder et al. | |
| 9,192,089 B2 | 11/2015 | Bassett | |
| 9,213,905 B2 | 12/2015 | Lange | |
| 9,226,440 B2 | 1/2016 | Bassett | |
| 9,232,687 B2 | 1/2016 | Bassett | |
| 9,265,191 B2 | 2/2016 | Sauder et al. | |
| 9,288,937 B2 | 3/2016 | Sauder et al. | |
| 9,301,438 B2 | 4/2016 | Sauder et al. | |

(56)             References Cited

U.S. PATENT DOCUMENTS

| | | | |
|---|---|---|---|
| 9,332,689 B2 | 5/2016 | Baurer | |
| 9,338,937 B2 | 5/2016 | Sauder et al. | |
| 9,351,440 B2 | 5/2016 | Sauder et al. | |
| 9,462,744 B2 | 10/2016 | Isaacson | |
| 9,485,900 B2 | 11/2016 | Connell | |
| 9,510,498 B2 | 12/2016 | Tuttle et al. | |
| 9,523,496 B2 | 12/2016 | Bingham | |
| 9,532,496 B2 | 1/2017 | Sauder et al. | |
| 9,554,504 B2 | 1/2017 | Houck | |
| 9,578,802 B2 | 2/2017 | Radtke | |
| 9,585,301 B1 | 3/2017 | Lund | |
| 9,629,304 B2 | 4/2017 | Zielke | |
| 9,668,402 B2 | 6/2017 | Hagny | |
| 9,675,004 B2 | 6/2017 | Landphair et al. | |
| 9,681,601 B2 | 6/2017 | Bassett | |
| 9,693,496 B2 | 7/2017 | Tevs | |
| 9,699,958 B2 | 7/2017 | Koch | |
| 9,723,778 B2 | 8/2017 | Bassett | |
| 9,746,007 B1 | 8/2017 | Stoller | |
| 9,750,174 B2 | 9/2017 | Sauder et al. | |
| 9,752,596 B2 | 9/2017 | Sauder | |
| 9,788,472 B2 | 10/2017 | Bassett | |
| 9,801,332 B2 | 10/2017 | Landphair | |
| 9,814,172 B2 | 11/2017 | Achen et al. | |
| 9,848,522 B2 | 12/2017 | Bassett | |
| 9,848,523 B2 | 12/2017 | Sauder | |
| 9,854,733 B1 | 1/2018 | Kile | |
| 9,879,702 B2 | 1/2018 | Stoller | |
| 9,955,623 B2 | 5/2018 | Sauder et al. | |
| 9,968,033 B2 | 5/2018 | Dunn | |
| 10,045,477 B2 | 8/2018 | Hagny | |
| 10,064,322 B2 | 9/2018 | Luc | |
| 10,091,926 B2 | 10/2018 | Maro | |
| 10,104,830 B2 | 10/2018 | Heathcote | |
| 10,111,415 B2 | 10/2018 | Kolb | |
| 10,143,128 B2 | 12/2018 | Landphair et al. | |
| 10,231,376 B1 | 3/2019 | Stanhope | |
| 10,257,973 B2 | 4/2019 | Hubner | |
| 10,408,670 B2 | 9/2019 | Holcomb | |
| 10,548,259 B2 | 2/2020 | Heathcote | |
| 10,609,857 B2 | 4/2020 | Sauder | |
| 10,645,865 B2 | 5/2020 | Bassett | |
| 10,821,829 B2 | 11/2020 | Foster | |
| 10,959,369 B2 | 3/2021 | Sieling | |
| 11,144,775 B2 | 10/2021 | Ferrari | |
| 11,197,411 B2 | 12/2021 | Bassett | |
| 11,202,404 B2 | 12/2021 | Walter | |
| 11,212,954 B2 | 1/2022 | Maeder | |
| 11,277,961 B2 | 3/2022 | Campbell | |
| 11,612,096 B2 | 3/2023 | Sivinski | |
| 11,622,494 B2 | 4/2023 | Arnett et al. | |
| 11,672,195 B2 | 6/2023 | Stoller | |
| 12,075,719 B2 | 9/2024 | Strnad | |
| 12,158,388 B2 | 12/2024 | Yelle | |
| 2002/0056407 A1 | 5/2002 | Milne | |
| 2002/0073678 A1 | 6/2002 | Lucand | |
| 2003/0005867 A1 | 1/2003 | Richard | |
| 2003/0183141 A1 | 10/2003 | Bergere et al. | |
| 2004/0139895 A1 | 7/2004 | Thompson et al. | |
| 2005/0155536 A1 | 7/2005 | Wendte | |
| 2005/0172873 A1 | 8/2005 | Mayerle | |
| 2006/0086295 A1 | 4/2006 | Jensen | |
| 2008/0110382 A1 | 5/2008 | Brockmeier | |
| 2008/0229986 A1 | 9/2008 | Arksey | |
| 2008/0257237 A1 | 10/2008 | Friesen | |
| 2009/0056531 A1 | 3/2009 | Jessen | |
| 2009/0056537 A1 | 3/2009 | Jessen | |
| 2009/0112410 A1 | 4/2009 | Shull | |
| 2010/0180808 A1 | 7/2010 | Liu | |
| 2010/0192818 A1 | 8/2010 | Garner | |
| 2010/0270043 A1 | 10/2010 | Ankenman | |
| 2010/0319941 A1 | 12/2010 | Peterson | |
| 2011/0027479 A1 | 2/2011 | Reineccius | |
| 2011/0313575 A1 | 12/2011 | Kowalchuk | |
| 2012/0042813 A1 | 2/2012 | Liu et al. | |
| 2012/0046838 A1 | 2/2012 | Landphair et al. | |
| 2012/0048159 A1 | 3/2012 | Adams et al. | |
| 2012/0048160 A1 | 3/2012 | Adams | |
| 2012/0151910 A1 | 6/2012 | Sauder | |
| 2012/0186503 A1 | 7/2012 | Sauder | |
| 2012/0261149 A1 | 10/2012 | Schmidt | |
| 2012/0291680 A1 | 11/2012 | Rylander | |
| 2013/0032363 A1 | 2/2013 | Curry et al. | |
| 2013/0126430 A1 | 5/2013 | Kenley | |
| 2013/0248212 A1 | 9/2013 | Bassett | |
| 2013/0333601 A1 | 12/2013 | Shivak | |
| 2014/0026748 A1 | 1/2014 | Stoller | |
| 2014/0060869 A1 | 3/2014 | Blunier | |
| 2014/0116735 A1 | 5/2014 | Bassett | |
| 2014/0190712 A1 | 7/2014 | Bassett | |
| 2014/0214284 A1 | 7/2014 | Sauder et al. | |
| 2014/0216771 A1 | 8/2014 | Bassett | |
| 2014/0238284 A1 | 8/2014 | Kapphahn | |
| 2014/0262378 A1 | 9/2014 | Connors | |
| 2014/0303854 A1 | 10/2014 | Zielke | |
| 2014/0379230 A1 | 12/2014 | Koch | |
| 2015/0094916 A1 | 4/2015 | Bauerer et al. | |
| 2015/0107501 A1 | 4/2015 | Barton | |
| 2015/0176614 A1 | 6/2015 | Stoller | |
| 2015/0195988 A1 | 7/2015 | Radtke | |
| 2015/0264857 A1 | 9/2015 | Achen | |
| 2015/0271986 A1 | 10/2015 | Sauder | |
| 2015/0305229 A1 | 10/2015 | Sauder | |
| 2015/0319919 A1 | 11/2015 | Sauder | |
| 2016/0007521 A1 | 1/2016 | Kusler | |
| 2016/0007524 A1 | 1/2016 | Kusler | |
| 2016/0040692 A1 | 2/2016 | Stoller | |
| 2016/0128272 A1 | 5/2016 | Sauder | |
| 2016/0143213 A1 | 5/2016 | Kowalchuk | |
| 2016/0157412 A1 | 6/2016 | Sauder | |
| 2016/0212932 A1 | 7/2016 | Radtke | |
| 2016/0227700 A1 | 8/2016 | Wendte | |
| 2016/0227701 A1 | 8/2016 | Nelson | |
| 2016/0249525 A1 | 9/2016 | Baurer et al. | |
| 2017/0000016 A1 | 1/2017 | Prickel | |
| 2017/0013771 A1 | 1/2017 | Townsend | |
| 2017/0049044 A1 | 2/2017 | Stoller | |
| 2017/0086347 A1 | 3/2017 | Sauder | |
| 2017/0094889 A1 | 4/2017 | Garner | |
| 2017/0112043 A1* | 4/2017 | Nair | A01B 33/16 |
| 2017/0223947 A1 | 8/2017 | Gall | |
| 2017/0280616 A1 | 10/2017 | Gervais | |
| 2017/0354079 A1 | 12/2017 | Foster | |
| 2017/0357029 A1 | 12/2017 | Lakshmanan | |
| 2017/0359941 A1 | 12/2017 | Czapka | |
| 2017/0367252 A1 | 12/2017 | Sakaguchi | |
| 2018/0015490 A1 | 1/2018 | Grimm | |
| 2018/0024549 A1 | 1/2018 | Hurd | |
| 2018/0092287 A1 | 4/2018 | Garner | |
| 2018/0092288 A1 | 4/2018 | Garner | |
| 2018/0092289 A1 | 4/2018 | Wonderlich | |
| 2018/0092295 A1 | 4/2018 | Sugumaran | |
| 2018/0125000 A1 | 5/2018 | Levy | |
| 2018/0128933 A1* | 5/2018 | Koch | G01S 13/02 |
| 2018/0132422 A1 | 5/2018 | Hassanzadeh et al. | |
| 2018/0132423 A1 | 5/2018 | Rowan | |
| 2018/0168094 A1* | 6/2018 | Koch | G01J 5/0875 |
| 2018/0199499 A1 | 7/2018 | Adams | |
| 2018/0199505 A1 | 7/2018 | Beaujot | |
| 2018/0206393 A1 | 7/2018 | Stoller | |
| 2018/0210443 A1 | 7/2018 | Matsuzaki | |
| 2018/0263174 A1 | 9/2018 | Hodel | |
| 2018/0292339 A1 | 10/2018 | Gunzenhauser | |
| 2018/0317380 A1 | 11/2018 | Bassett | |
| 2018/0317381 A1 | 11/2018 | Bassett | |
| 2018/0368310 A1 | 12/2018 | Zimmerman | |
| 2018/0373264 A1 | 12/2018 | Madsen | |
| 2019/0021211 A1 | 1/2019 | Gutknecht | |
| 2019/0029165 A1 | 1/2019 | Leimkuehler et al. | |
| 2019/0045703 A1 | 2/2019 | Bassett | |
| 2019/0059206 A1 | 2/2019 | Stanhope | |
| 2019/0072114 A1 | 3/2019 | Myers et al. | |
| 2019/0075714 A1 | 3/2019 | Koch | |
| 2019/0124824 A1 | 5/2019 | Hubner | |

(56) References Cited

U.S. PATENT DOCUMENTS

| | | | |
|---|---|---|---|
| 2019/0162164 A1 | 5/2019 | Funk | |
| 2019/0174666 A1 | 6/2019 | Mantemach | |
| 2019/0191622 A1 | 6/2019 | Hafvenstein | |
| 2019/0232304 A1 | 8/2019 | Grimm | |
| 2019/0239413 A1 | 8/2019 | DeGarmo | |
| 2019/0254223 A1* | 8/2019 | Eichhorn | A01B 63/16 |
| 2019/0286915 A1 | 9/2019 | Patil | |
| 2019/0289778 A1 | 9/2019 | Koch | |
| 2019/0297769 A1 | 10/2019 | Zielke et al. | |
| 2019/0297774 A1 | 10/2019 | Hamilton | |
| 2019/0302799 A1 | 10/2019 | Schaff | |
| 2019/0373801 A1 | 12/2019 | Schoeny | |
| 2019/0380259 A1 | 12/2019 | Frank | |
| 2019/0387662 A1 | 12/2019 | Viriat | |
| 2020/0029486 A1 | 1/2020 | Buehler et al. | |
| 2020/0045869 A1 | 2/2020 | Stanhope | |
| 2020/0053954 A1 | 2/2020 | Hamilton | |
| 2020/0068778 A1 | 3/2020 | Schoeny | |
| 2020/0068783 A1 | 3/2020 | Strnad | |
| 2020/0100418 A1 | 4/2020 | Komecki | |
| 2020/0100419 A1 | 4/2020 | Stanhope | |
| 2020/0100421 A1 | 4/2020 | Wang | |
| 2020/0100423 A1 | 4/2020 | Dienst | |
| 2020/0109954 A1 | 4/2020 | Li | |
| 2020/0128723 A1 | 4/2020 | Eichhorn | |
| 2020/0154627 A1 | 5/2020 | Plattner | |
| 2020/0154629 A1 | 5/2020 | Holoubek et al. | |
| 2020/0178455 A1 | 6/2020 | Ishikawa | |
| 2020/0217044 A1 | 7/2020 | Martel | |
| 2020/0221630 A1 | 7/2020 | Pomedli | |
| 2020/0296882 A1 | 9/2020 | Madison | |
| 2020/0305335 A1 | 10/2020 | Schoeny | |
| 2020/0329631 A1 | 10/2020 | Johnson | |
| 2020/0337218 A1 | 10/2020 | Puhalla | |
| 2020/0352088 A1 | 11/2020 | Arnett | |
| 2020/0359559 A1 | 11/2020 | Koch | |
| 2020/0375081 A1 | 12/2020 | Holoubek | |
| 2020/0375085 A1 | 12/2020 | Strnad | |
| 2020/0375090 A1 | 12/2020 | Morgan | |
| 2021/0022286 A1 | 1/2021 | Gilbert et al. | |
| 2021/0051846 A1 | 2/2021 | Vandenbark | |
| 2021/0059102 A1 | 3/2021 | Geistkemper | |
| 2021/0120726 A1 | 4/2021 | Barrick | |
| 2021/0132618 A1 | 5/2021 | Van Roekel | |
| 2021/0153421 A1 | 5/2021 | Holoubek et al. | |
| 2021/0161060 A1 | 6/2021 | Kaufmann | |
| 2021/0185903 A1 | 6/2021 | Demiter et al. | |
| 2021/0235611 A1 | 8/2021 | Fett | |
| 2021/0243939 A1 | 8/2021 | Strnad | |
| 2021/0243941 A1 | 8/2021 | Buehler | |
| 2021/0307236 A1 | 10/2021 | Strnad | |
| 2021/0315147 A1 | 10/2021 | Fanshier | |
| 2022/0000008 A1 | 1/2022 | Hubner | |
| 2022/0061202 A1 | 3/2022 | Holoubek et al. | |
| 2022/0061208 A1 | 3/2022 | Campbell et al. | |
| 2022/0142039 A1 | 5/2022 | Eichhorn et al. | |
| 2022/0151138 A1 | 5/2022 | Barry | |
| 2022/0174855 A1 | 6/2022 | Zielke et al. | |
| 2022/0232753 A1 | 7/2022 | Van De Woestyne | |
| 2022/0272888 A1 | 9/2022 | Hodel | |
| 2022/0369534 A1 | 11/2022 | Nikolakakis | |
| 2023/0145955 A1 | 5/2023 | Schmidt et al. | |
| 2023/0180653 A1 | 6/2023 | Barry et al. | |
| 2023/0232733 A1 | 7/2023 | Barry | |
| 2023/0388458 A1 | 11/2023 | Eichhorn et al. | |
| 2023/0413720 A1 | 12/2023 | Barry et al. | |
| 2024/0167848 A1 | 5/2024 | Johnson | |
| 2024/0180066 A1 | 6/2024 | Holoubek | |
| 2024/0334864 A1 | 10/2024 | Holoubek et al. | |
| 2025/0133977 A1 | 5/2025 | Barry et al. | |
| 2025/0348988 A1 | 11/2025 | Eichhorn | |

FOREIGN PATENT DOCUMENTS

| | | | | | |
|---|---|---|---|---|---|
| AU | 2017382800 | B2 | 6/2018 | | |
| AU | 2018100865 | B4 | 6/2022 | | |
| CA | 2346724 | A1 | 4/2000 | | |
| CA | 2549371 | A1 | 11/2007 | | |
| CA | 2584736 | A1 | 9/2008 | | |
| CA | 2727188 | A1 * | 12/2009 | .......... | A01B 63/008 |
| CN | 108362267 | A | 8/2018 | | |
| CN | 110667889 | A | 1/2020 | | |
| CN | 112601450 | A | 4/2021 | | |
| DE | 202005007450 | U1 | 7/2005 | | |
| EP | 372901 | A2 | 6/1990 | | |
| EP | 606541 | A1 | 1/1997 | | |
| EP | 3219186 | A1 | 9/2017 | | |
| EP | 2901838 | B1 | 11/2017 | | |
| EP | 3698615 | A1 | 8/2020 | | |
| GB | 18381 | A | 10/1904 | | |
| GB | 2309622 | A | 6/1997 | | |
| JP | 4517467 | B2 | 8/2010 | | |
| KR | 101728137 | B1 | 4/2017 | | |
| RU | 2355152 | C2 | 5/2009 | | |
| SU | 948316 | A1 | 8/1982 | | |
| SU | 1148582 | A | 4/1985 | | |
| WO | 2009134144 | A1 | 11/2009 | | |
| WO | 2014153157 | A1 | 9/2014 | | |
| WO | 2015171908 | A1 | 11/2015 | | |
| WO | 2017160860 | A1 | 9/2017 | | |
| WO | 2017197274 | A1 | 11/2017 | | |
| WO | 2017197292 | A1 | 11/2017 | | |
| WO | 2018151989 | A1 | 8/2018 | | |
| WO | 2020012369 | A3 | 1/2020 | | |
| WO | WO2020049467 | A1 | 3/2020 | | |
| WO | 2021021594 | A1 | 2/2021 | | |
| WO | 2021231159 | A1 | 11/2021 | | |

OTHER PUBLICATIONS

360 Yield Sensor—Wave—Date Unknown, available as early as 2020.

8910 Floating Hitch Cultivator, Date Unknown, available as early as 2010—https://www.bourgault.com/en-us/products/tillage/8910-cultivator.

Boss 18 Metre Parallelogram Tyne Planter—https://www.thecombineforum.com/threads/boss-18-metre-parallelogram-tyne-planter-on-9-spacing.222722/, Date Unknown, available as early as 2010.

Contour King Gallery—ZML, Date Unknown, available as early as 2013.

Dawn ACS Explanation video, https://twitter.com/DawnEquipment/status/969698839409111045.

Deere "SeedStar 2 Deere SeedStar XP Monitor for Planters" pp. 70-78-70-9.

Enfield Technologies, EQV Proportional Pinch Valves, https://www.enfieldtech.com/Products/EQV-Proportional-Pinch-Valves.

Farm Equipment—ZML.

Ground Breaker Precision Planters and Patented Tyne and Disc Row Units—https://www.precisionagsolutions.com.au/ground-breaker.

Industrial Electronics Robust control of active suspensions for high performance vehicles, Proceedings of IEEE International Symposium on Industrial Electronics, 1996.

Industrial electronics, modeling and force tracking control of hydraulic actuator for an active suspension system, 2006 1st IEEE Conference on Industrial Electronics and Applications, 2006.

Janke Australia, Date Unknown, available as early as 2017—https://www.janke.com.au/.

John Deere Delta Force Diagram.

Kasper, relationship between six years of corn yields and terrain attributes, ISU—Kaspar, Tom & Colvin, Thomas & Jaynes, D.B. & Karlen, Douglas & James, David & Meek, David & Pulido, Daniel & Butler, Howard. (2003). Relationship Between Six Years of Corn Yields and Terrain Attributes. Precision Agriculture. 4. 87-101.

Gratton et al., Manitoba, Design of a spring-loaded downforce system for a no-till seed opener, 2003.

(56)     References Cited

OTHER PUBLICATIONS

Zong-yi et al., Minesweeping Tank, Electrohydraulic System Using RBF Neural Network and Genetic Algorithm, 2010.

Modular Row Crop Planting Systems from Excel Agriculture, Date Unknown, available as early as 2002—https://www.excelagr.com.au/excel-agri-row-crop-planter.php.

Orthman ItRIPr row unit, 2019—https://www.orthmanequip.com/strip-tillage/1tripr/.

Parallelogram Tyne Units—https://bossagriculture.com.au/home/planter-row-units/parallelogram-tyne-units/.

Patriot Parallelogram Tyne Planter Farm Equipment Gessner, available as early as 2017—https://www.gessner.com.au/products/patriot-parallelogram-tyne-planter/.

Precision Planting 2010 Full Line Brochure.

Precision Planting Furrowforce—https://precisionplanting.com/products/product/furrowforce.

Precision Planting FurrowJet, Date Unknown—available as early as 2017, https://precisionplanting.com/products/product/furrowjet.

Precision tyne planter takes innovation award, 2017, https://www.graincentral.com/machinery/precision-tyne-planter-takes-innovation-award.

What to Look for in a No Till or Minimum Tillage Planter—https://multifarmingsystems.com.au/wp-content/uploads/2015/07/What-to-Look-for-in-a-No-Till-or-Minimum-Tillage-Planter.pdf.

ZML Contour King, Youtube Video Aug. 13, 2021, https://www.youtube.com/watch?v=T-rj_EZMCM4.

* cited by examiner

DEVICES, SYSTEMS, AND METHODS FOR SEED TRENCH PROTECTION

CROSS-REFERENCE TO RELATED APPLICATION

This application is a divisional of U.S. application Ser. No. 16/371,815, filed Apr. 1, 2019, and entitled "Devices, Systems, and Methods for Seed Trench Protection," and claims the benefit under 35 U.S.C. § 119(e) to U.S. Provisional Application 62/650,779, filed Mar. 30, 2018, and entitled "Seed Trench Protection from Foreign Material Ingress," each of which is hereby incorporated herein by reference in its entirety for all purposes.

TECHNICAL FIELD

The present disclosure relates to agricultural planters, and more specifically, seeders that cut a trench in the soil, dispense seeds in the open trench, and close the soil around the seed. In various implementations, the disclosed devices, systems and methods prevent foreign materials, such as crop residue, dry soil, soil clods, and other unwanted foreign material from entering open seed trenches during planting.

BACKGROUND

Uniform seed germination and plant emergence are critical to achieve maximum yield potential for agricultural crops such as corn. Unwanted foreign materials, such as crop residue, in the trench beside or above the seed can communicate disease, delay germination, and/or cause late emergence. Additionally, dry crop residue, dry soil, clods, other foreign matter, or a combination thereof can block all or part of a seed from contacting moist soil, thereby delaying germination when compared to seeds in full contact with moist soil. Also, seedling shoots that must grow through or around residue, clods, and other foreign matter, may emerge later than seeds in a clean, unimpeded trench. This delayed germination and/or late emergence can negatively affect overall crop yield.

As shown in FIGS. 1-3, rotating gauge wheels 16 and row cleaners 12 are known to move/throw unwanted foreign material 2, including crop residue 2, into open trenches 4. Faster machine speeds can exacerbate this problem. Additionally, crop residue 2 and foreign matter 2 can be found on the soil surface very close to the open trench 4 after the foreign matter passes underneath the gauge wheels 16. Often, this crop residue 2 and foreign matter 2 passes through or feeds between the two closing discs 14. As the closing discs 14 pinch the trench 4 closed with surrounding soil, the crop residue 2 or foreign matter 2 can be buried in the trench 4 or left on the soil surface above the emerging seedling. As discussed above, foreign material 2 in the seed trench 4 or above the seed can negatively affect crop yield.

As such, there is a need in the art for devices, systems, and methods to prevent crop residue 2 and foreign material 2 from entering an open seed trench 4 during planting.

BRIEF SUMMARY

Disclosed herein are various devices, systems, and methods for preventing unwanted foreign material from entering a seed trench during planting.

One Example includes an agricultural planter including a plurality of row units including one or more opening discs; one or more gauge wheels; one or more closing discs; a trench protection system including at least one of an adjustable row cleaner and/or a shield. Other embodiments of this Example include corresponding computer systems, apparatus, and computer programs recorded on one or more computer storage devices configured to perform the actions of the methods.

Implementations according to this Example may include one or more of the following features. The Example further including at least one row cleaner actuator. The Example including at least one adjustable row cleaner that is adjustable via the at least one actuator to adjust at least one of tilt angle, pitch angle, and wheel depth. The Example including a flexible shield disposed between the gauge wheels and the closing discs to block residue from entering an open seed trench. The Example including a shield, where the shield is attached to a seed firmer. The Example where the shield further includes a cover disposed on the seed firmer. The Example including a shield, where the shield is angled away from the one or more closing discs. The Example including a selectively detachable shield. The Example including a shield, where the shield is constructed and arranged to roll along a ground surface. The planter including a shield, where the shield moves independently of a seed firmer. The Example including a flexible shield and an adjustable row cleaner including at least one row cleaner actuator. Implementations of the described techniques may include hardware, a method or process, or computer software on a computer-accessible medium.

One Example includes a seed trench protecting system for a row unit including at least one closing disc; at least one gauge wheel; and a trench protection system including a row cleaner including a row cleaner row unit; and a shield disposed between the at least one gauge wheel and the at least one closing disc, where the shield prevents ingress of foreign material into an open seed trench. Other embodiments of this Example include corresponding computer systems, apparatus, and computer programs recorded on one or more computer storage devices configured to perform the actions of the methods.

Implementations according to this Example may include one or more of the following features. The Example further including at least two row cleaner wheels. The Example where the row cleaner wheels further include tines and a length of the tines is automatically adjustable. The Example where tine length increases as planting speed increases. The Example where row tilt angle, pitch angle, and depth of the row cleaner wheels is automatically adjustable. The Example where the pitch angle decreases as planting speed increases.

Another Example is directed to an agricultural planting system for a row unit including at least one closing disc; at least one gauge wheel; and a trench protection system including an adjustable row cleaner.

Implementations according to this Example may include one or more of the following features. The Example where the adjustable row cleaner includes at least two row cleaner wheels, and at least one of the row tilt angle, pitch angle, and depth of the row cleaner wheels is automatically adjustable. The Example where row cleaner wheel pitch angle decreases as planting speed increases. The Example where the adjustable row cleaner includes at least two row cleaner wheels, and the row cleaner wheels further include tines and the length of the tines is automatically adjustable. The Example where tine length increases as planting speed increases. The Example further including a shield.

In various Examples, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While multiple implementations are disclosed, still other implementations of the present disclosure will become apparent to those skilled in the art from the following detailed description, which shows and describes illustrative implementations of the invention. As will be realized, the disclosure is capable of modifications in various obvious aspects, all without departing from the spirit and scope of the present disclosure. Accordingly, the drawings and detailed description are to be regarded as illustrative in nature and not restrictive.

DETAILED DESCRIPTION

The various implementations disclosed or contemplated herein relate to devices, systems, and methods for protecting open seed trenches from foreign material. More particularly, to various devices, systems, and methods for shielding or otherwise preventing the entrance of foreign material into an open seed trench or furrow. The various shield devices may be attached to a planter row unit between the opening wheels and closing discs to protect the open seed trench from foreign matter. Various implementations may also include an optional row cleaner for moving foreign material. By minimizing the amount of foreign matter in and around the seed trench, the disclosed implementations can prevent yield loss by controlling for growth retarding circumstances including disease, delayed germination, late emergence and the like.

The trench protection system 1 may include various optional components, systems, and subsystems. For example, in certain implementations, the protection system includes at least one of an optional adjustable row cleaner and/or an optional shields. The various optional components, systems, and subsystems as described herein can be implemented individually or in any combination of the protection system 1.

Figure 1:
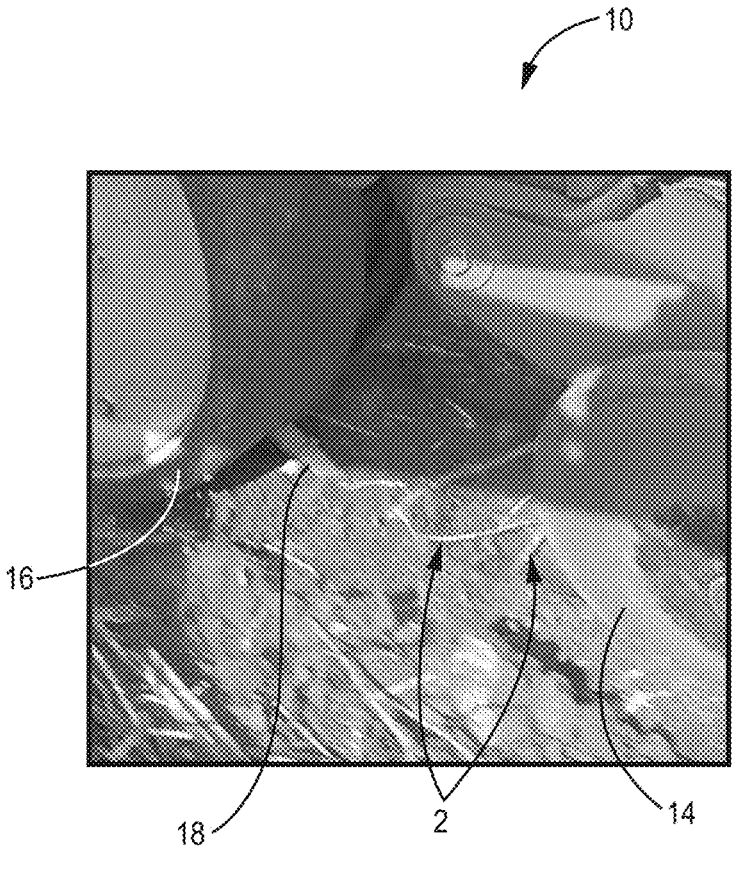
FIG. 1 is a perspective view of a field under a row unit during planting, according to one implementation.
Figure 2:
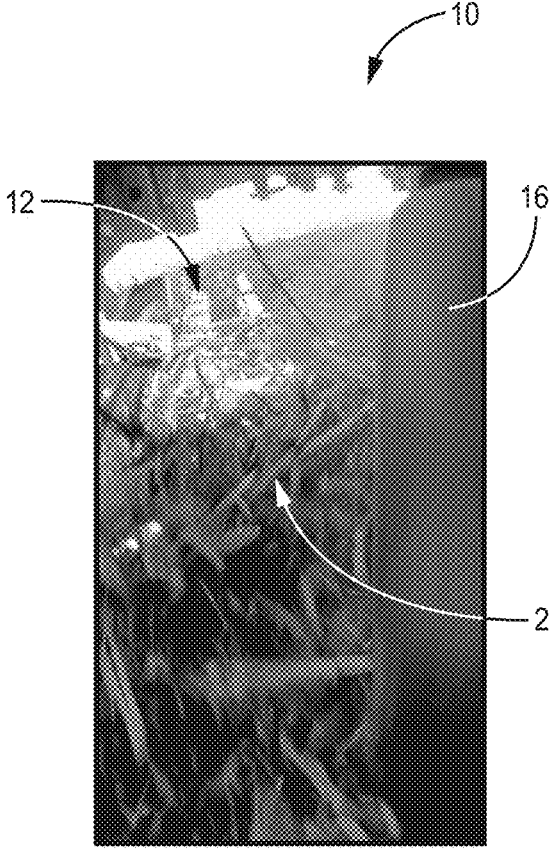
FIG. 2 is a perspective view of a field near a row unit during planting, according to one implementation.
Figure 3:
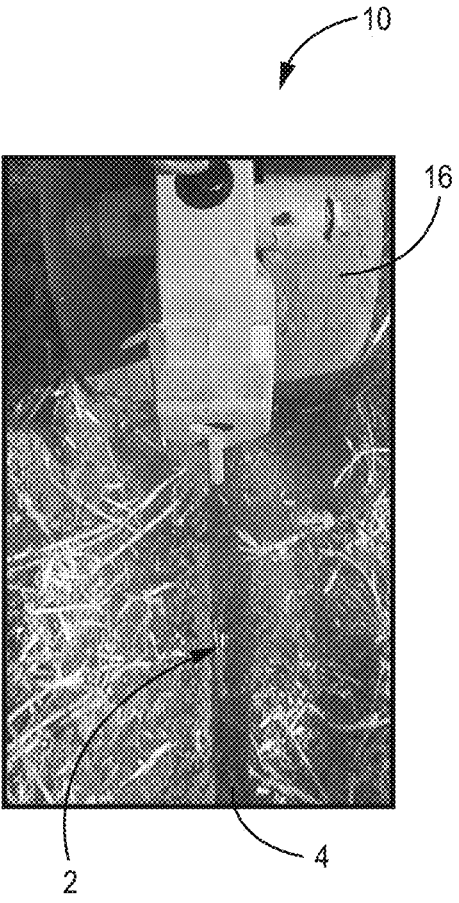
FIG. 3 is a top view of an open seed trench, according to one implementation.
Figure 4:
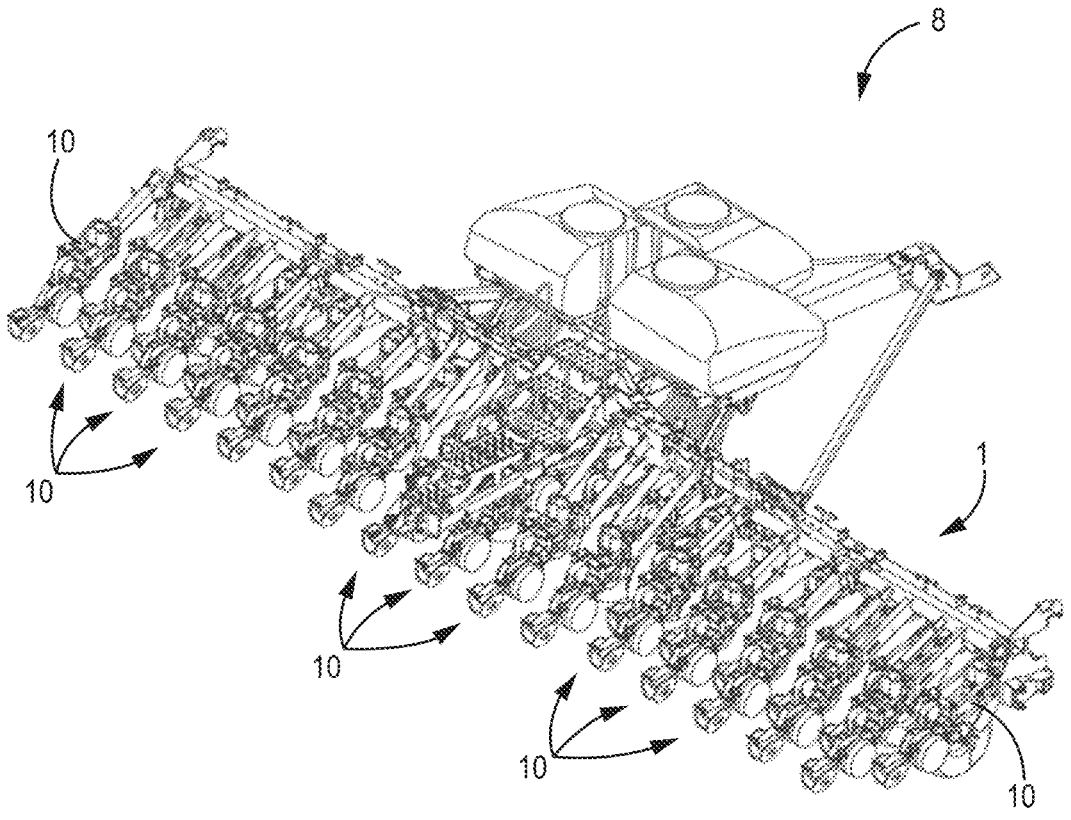
FIG. 4 is a perspective view of a planter, according to one implementation.
Figure 5A:
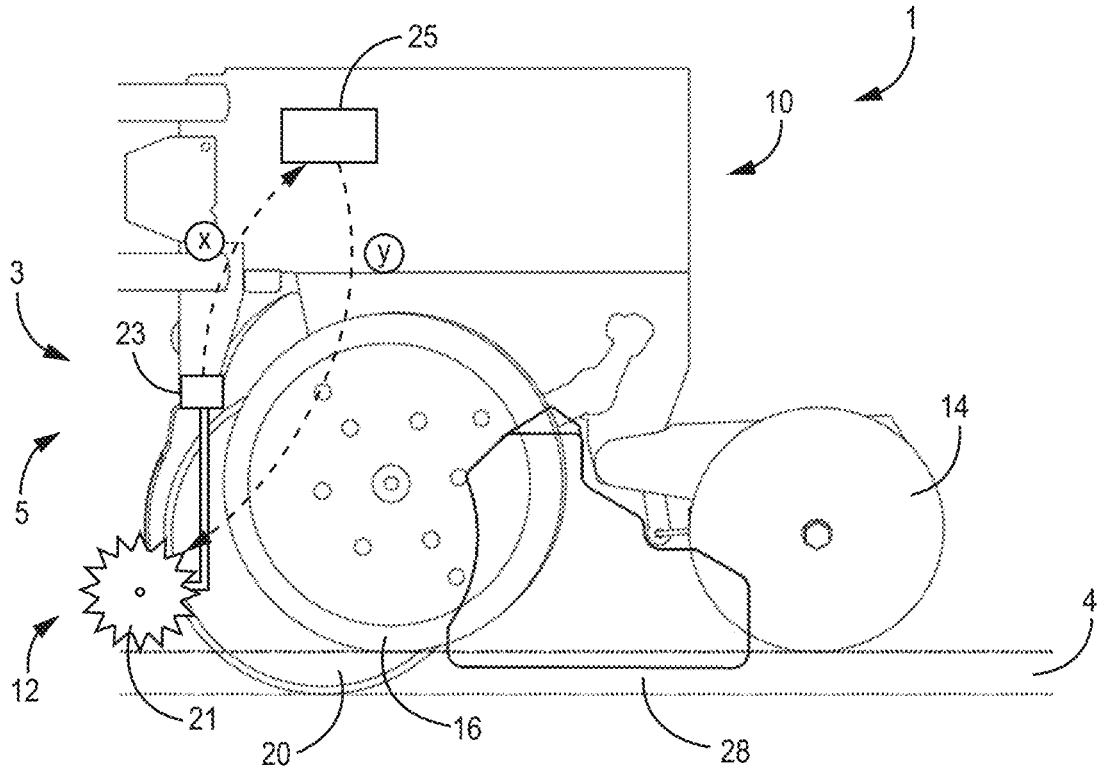
FIG. 5A is a side view of a row unit with a row cleaner, according to one implementation.

As is shown generally in FIG. 4, agricultural planters 8 typically have a plurality of individual row units 10. An exemplary row unit 10 is depicted in FIG. 5A. These row units 10 may also have various optional components including row cleaners 12, closing discs 14, gauge wheels 16, opening discs 20 and others. Certain row units 10 may include all or some of these components, as is well understood in the art, and the specific configurations can change depending on use.

Row cleaners 12 are configured to remove residue 2 in front of the opening discs 20. The trench protection system 1 according to certain implementations includes an optional adjustable row cleaner 12. In various implementations, the adjustable row cleaner 12 has an associated adjustment system 3.

In the implementations of the system 1 in FIGS. 5A, 5B and 6A-6E, the planter row unit 10 has a row cleaner 12 with a row cleaner wheel unit 21. The row cleaner wheel unit 21 can, in certain implementations have paired row cleaner wheels 22A, 22B. The row cleaner wheel unit 21 and paired row cleaner wheels 22A, 22B can automatically or manually adjust via an adjustment system 3 to change the amount, velocity, and direction of residue 2 removed by the row cleaner wheel unit 21 and the paired row cleaner wheels 22A, 22B.

In various implementations, and as detailed further below, row cleaner 12 adjustments may include, but are not limited to, altering the depth of the row cleaner wheel unit 21 and paired row cleaner wheels 22A, 22B, angle of the row cleaner wheel unit 21 and paired row cleaner wheels 22A, 22B, or the shape of the row cleaner wheel unit 21 and paired row cleaner wheels 22A, 22B.

It is understood that the adjustment of row cleaners 12 using prior art techniques was often cumbersome requiring frequent adjustments in order to effectively remove residue 2 without removing significant amounts of soil. Maintaining the proper calibration of row cleaners 12 was additionally made difficult because the proper calibration depends on a variety of factors including planting speed, residue quantity, soil type, and other factors as would be recognized. These variables may change quickly and many times throughout a field. The row cleaner 12 and adjustment system 3 disclosed herein can adjust the row cleaner 12 as needed allowing for proper calibration of the row cleaner 12 throughout planting.

In the various implementations shown in FIGS. 5A, 5B and 6A-6E, adjustment of the row cleaner 12 may be automatic, and may be partly or wholly controlled by feedback from vehicle speed, crop residue quantity, cleaner wheel RPM, soil type, and/or other sensors or feedback mechanisms as would be appreciated by those of skill in the art.

In certain of these implementations, the adjustment system 3 includes a closed loop feedback control system 5. The closed loop feedback control system 5 may include sensors 23 that monitor the flow of soil, spread of soil, and/or residue moved by the row cleaners 12, as is shown in relation to FIG. 5A.

Figure 5B:
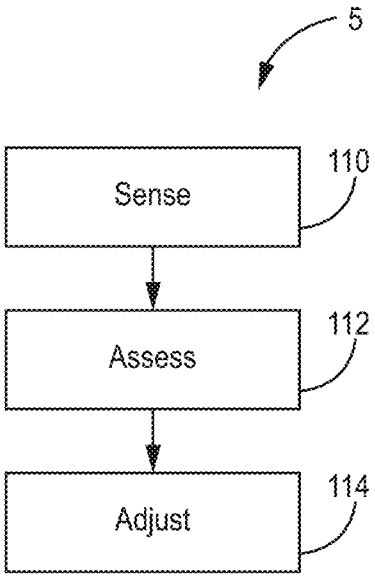
FIG. 5B is a flow chart depicting a closed loop feedback control system, according to one implementation.

The closed feedback control system 5 as shown in FIG. 5A has sensors 23 in communication with one or more controllers 25 in communication with the row cleaner 12. In various implementations, the connections between these components are electrical and/or wired or wireless. FIG. 5B shows an exemplary flow chart of the closed feedback control system 5.

In various implementations, the sensors 23 are constructed and arranged to detect or otherwise sense (box 110) varying conditions, as described above. The sensors 23 are in communication with the controller 25. The controller 25 may be located on the row unit 10 or elsewhere on the planter 8, associated tractor, or elsewhere as would be appreciated by those of skill in the art.

The controller 25 is constructed and arranged to assess (box 112) the various inputs from the sensors 23. The controller 25 is in turn in communication with the row cleaner 12, actuator(s) 27 and/or associated adjustment system 3 and may adjust (box 114) the row cleaner 12 in accordance with the sensed (box 110) conditions via commands directed to the actuator(s) 27. It would be appreciated by those of skill in the art that the steps and processes of the closed feedback control system 5 can be performed in any order and may include additional steps.

In one example, the row cleaner 12 may be automatically adjusted for changes in planting speed. Known row cleaners 12 have typically been optimized for speeds of about 4-5 miles per hour, and it is understood that the use of these known row cleaners 12 at higher speeds may result in residue 2 being thrown into adjacent rows including into seed trenches 4. The disclosed row cleaner 12 can be automatically adjusted via the adjustment system 3 to account for faster planting speeds to remove residue 2 without removing excess soil and/or throwing residue 2 into adjacent rows and trenches 4. Additionally, the change in planting speed can be detected by a sensor 23 and the closed loop control system 5. When the change in speed is detected or sensed (box 110) by the sensors 23, a signal may be sent to the controller 25. The controller 25 may then assess (box 112) the signal from the sensor 23. The controller may then send a corresponding signal to the adjustment system 3 and associated components to indicate to the adjustment system 3 that the row cleaner 12 should be adjusted (box 114).

The sensors 23 may be residue sensors 23, which may include, but are not limited to, vision systems, radar, laser imaging, ultrasound, or any variety of contact sensors. The automatic row cleaner adjustment system 3 according to certain implementations may utilize feedback from residue sensors 23 detecting and/or measuring residue moving towards open seed trenches, including the seed trenches of adjacent rows. Certain non-limiting examples of sensors 23 that can measure vehicle speed include: GPS, vehicle speedometer and ground engaging devices, such as the row cleaners 12.

Figures 6A, 6B, 6C, 6D, 6E:
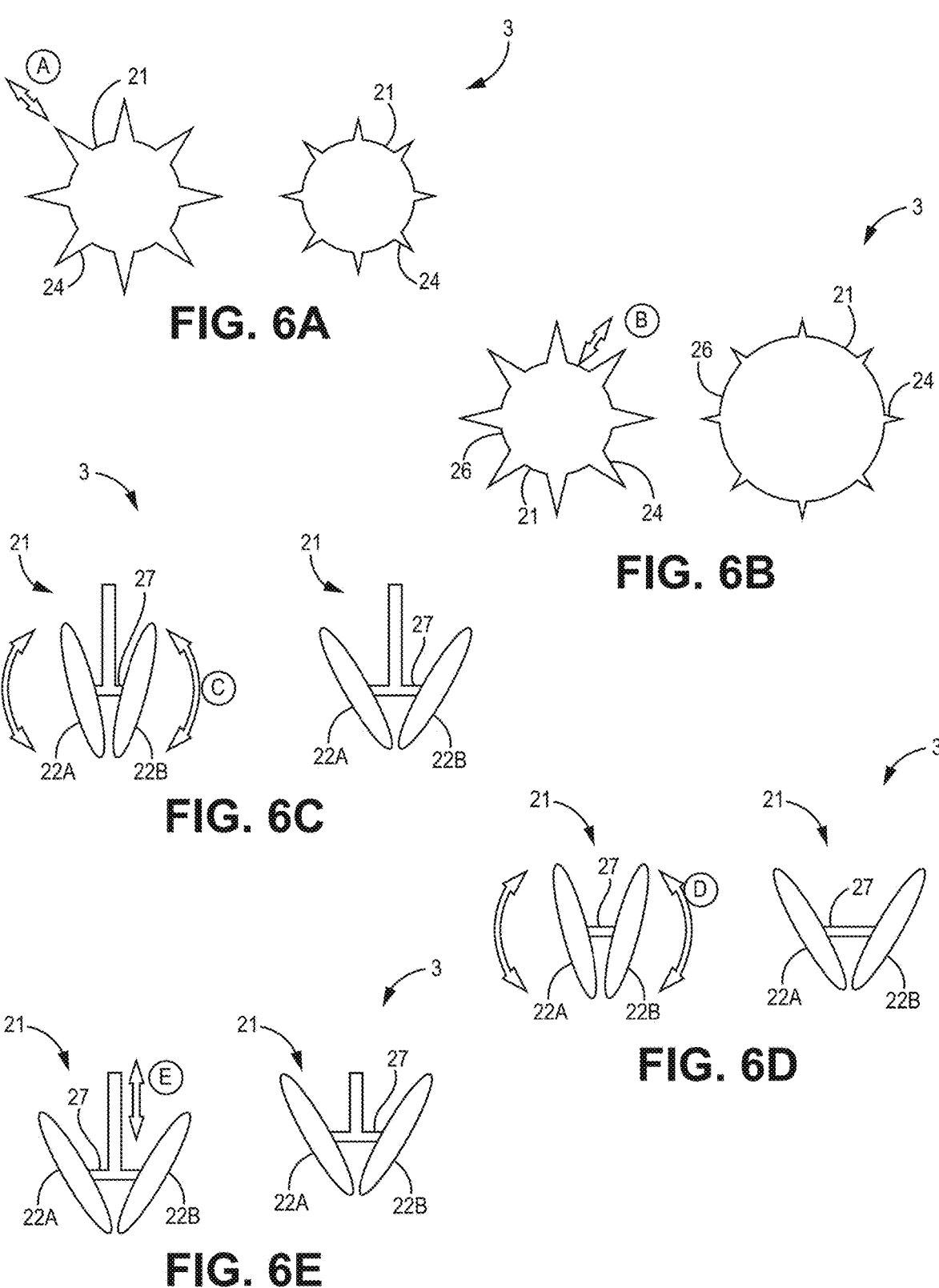
FIG. 6A is a side view of row cleaner wheels, according to one implementation.
FIG. 6B is a side view of row cleaner wheels, according to one implementation.
FIG. 6C is a front view of a row cleaner, according to one implementation.
FIG. 6D is a top view of a row cleaner, according to one implementation.
FIG. 6E is a front view of a row cleaner, according to one implementation.

Continuing with the implementations of FIGS. 6A-6E, adjustments to the row cleaner 12 may include changing the shape of the row cleaner wheel unit 21, and/or paired row cleaner wheels 22A, 22B. As shown in FIG. 6A, the tines 24 of the row cleaner wheel unit 21 can be extended or retracted, in the direction of reference arrow A.

As shown in FIG. 6B, the depth band 26 of the row cleaner wheel unit 21 can be adjusted. The depth band 26 can be extended or narrowed, in the direction of reference arrow B. In these and other implementations, the effect may be such that the tines 24 are lengthened to move more residue 2 or conversely the tines 24 are shortened to move less residue 2. In use, according to these implementations, these adjustments to the tines 24 and/or depth band 26 can be made via actuators 27. In various other implementations adjustments may be made via mechanical linkages, weights, springs, and/or actively controlled with electric, pneumatic, or hydraulic actuators 27, as well as additional actuators 27 and technologies understood by the skilled artisan. Adjustments can be made automatically or manually via the adjustment system 3.

In some implementations, adjustments to the row cleaner wheel unit 21 and paired row cleaner wheels 22A, 22B may also include altering the angle of the paired row cleaner wheels 22A, 22B. That is, in some implementations the tilt angle can be adjusted—such as in the direction of reference arrow C shown in FIG. 6C. In FIG. 6C, as viewed from the front, the tilt angle C between the two paired row cleaner wheels 22A, 22B can be increased or decreased as desired.

In these and other implementations, the pitch angle may also be adjusted—such as in the direction of reference arrow D shown in FIG. 6D. The pitch angle D viewed from the top in FIG. 6D, is the angle between the two paired row cleaner wheels 22A, 22B and can be increased or decreased as desired.

In one exemplary implementation, as travel speed increases, the adjustment system 3 may automatically decrease the pitch angle D such that the angle at which the residue 2 is thrown away from the row cleaner 12 is away from the adjacent row(s). In an alternative implementation, as travel speed decreases, the adjustment system 3 may automatically increase pitch angle D, such that the row cleaner 12 sweeps a wider path of residue 2 for the row. Further implementations would be apparent to those of skill in the art.

Shown in FIG. 6E, row cleaner wheel unit 21 may increase or decrease in depth, in the direction of reference arrow E. In one example, when the circumference velocity of the row cleaner wheel unit 21 is less than vehicle speed, the adjustment system 3 may adjust the row cleaner wheel unit 21 and/or paired row cleaner wheels 22A, 22B such that their depth is increased. In another example, the system 3 may increase the depth of the row cleaner wheel unit 21 and/or paired row cleaner wheels 22A, 22B when quantity of residue 2 increases.

The above described adjustments to the row cleaner 12 and row cleaner wheel unit 21 and paired row cleaner wheels 22A, 22B can be used individually or in any combination, as desired. In various implementations adjustments to the row cleaner wheels 22A, 22B can be made via actuators 27, such as electrical, hydraulic, and/or pneumatic actuators. In these and other implementations, adjustments to the row cleaner wheels 22A, 22B are made via mechanical linkages, weights, and/or springs.

In further implementations of the protection system 1, the planter row unit 10 may include various shields 28 disposed substantially between the opening discs 20 and the closing discs 14 to protect the seed trench 4 from ingress of foreign material 2. These implementations having shields 28 may be used in addition to or instead of the row cleaner 12 with the adjustment system 3 as described above.

FIGS. 7-20 depict various implementations wherein the protection system 1 has a shield 28 used to block foreign material 2 from entering a seed trench 4. In various implementations, the shield 28 is constructed and arranged to provide a physical barrier to the seed trench 4 or furrow. The shield 28 is additionally constructed and arranged to shield crop residue 2 or other foreign material 2 to prevent the material 2 from entering an open trench 4 between the opening discs 20/gauge wheels 16 and closing discs 14. By shielding the trench 4 from foreign material 2 crop yield can be improved by controlling for growth retarding circumstances including disease, delayed germination, and late emergence.

It is understood that elements of any of the disclosed implementations may be modularly combined to suit the variations and nuances of different row units 10 and applications. For example, a shield 28 may be combined with a seed firmer 18 and mounted at a mounting point 32 to a row unit 10. Alternatively, the shield 28 may be attached with a row unit 10 at a different point from the seed firmer 18 to provide independent shielding and firming functions, such that the seed firmer 18 and shield 28 do not interfere or impede the action of the other.

Figure 7:
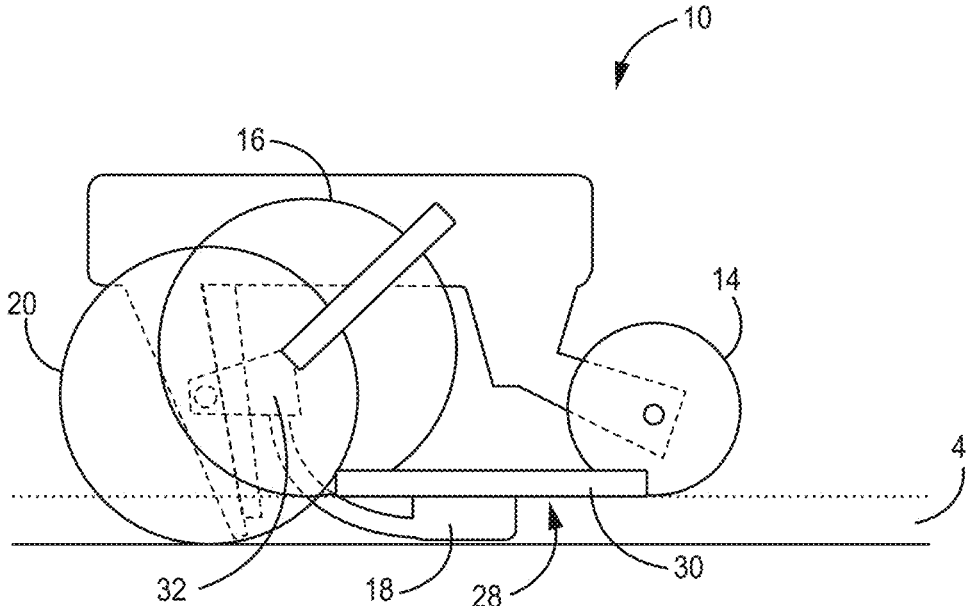
FIG. 7 is a side view of a planter row unit, according to one implementation.
Figure 8:
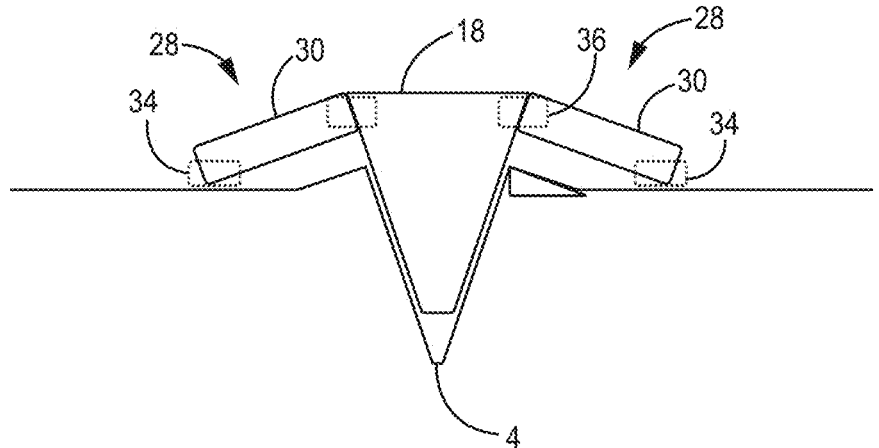
FIG. 8 is a front view of a seed firmer, according to one implementation.

As shown in FIGS. 7 and 8, in some implementations, the shield 28 comprises an elongate, substantially planar, optionally adjustable cover 30. In certain implementations, the cover 30 is molded into or otherwise fixedly attached to the top of the firmer 18 such that the cover 30 extends beyond the width of the seed trench 4, at or above the soil level. In various implementations, the cover 30 is selectively adjustable and/or releasable. Adjustments to the cover 30 can be made to account for optimal placement of the cover 30 for the desired planting depth.

In various implementations, where the shield 28 is used in connection with a seed firmer 18 that rides in the trench 4 below the shield 28. The firmer 18 may be able to move independently of the shield 28. Additionally, the shield 28 may incorporate a firmer 18 that is placed in the trench 4 on its own spring-loaded arm.

In various implementations, the height of the firmer 18 may be adjusted, that is increased or decreased—for example such that the firmer 18 extends above the seed trench 4. The position of the cover 30 may be adjustable.

The size of the cover 30 may be such that the cover 30 extends from the rear edge of the opening discs 20 to the pinch point of the closing discs 14. Various other sizes and configurations are of course possible.

Figure 9:
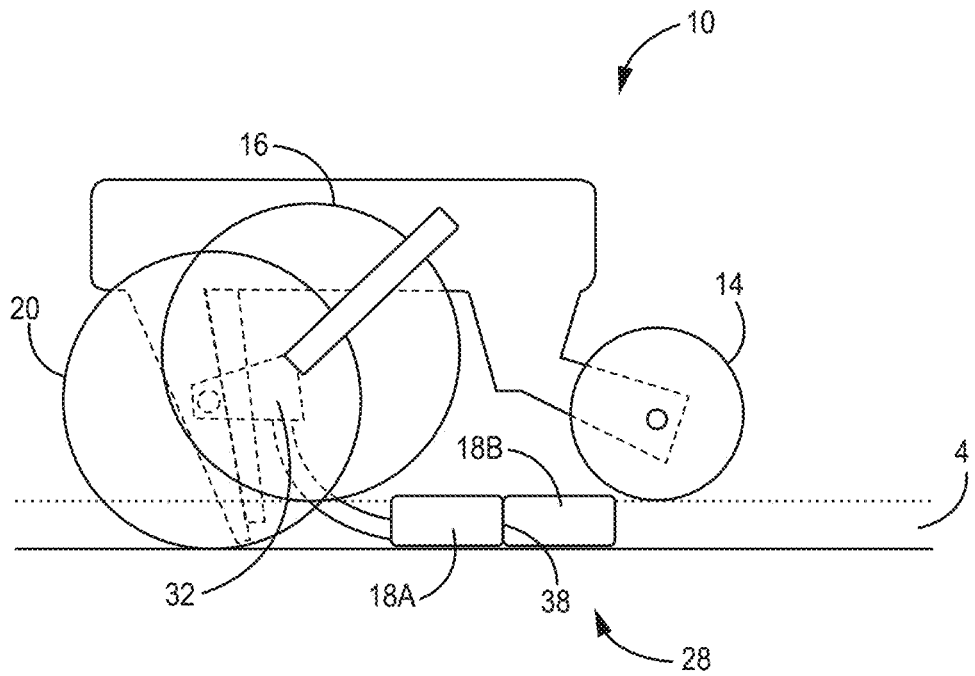
FIG. 9 is a side view of a planter row unit, according to one implementation.

In various implementations, the cover 30 is constructed and arranged such that the overall size and shape of the firmer 18 may be adapted or increased to fill more of the seed trench 4 than a traditional firmer 18. The larger firmer 18A, 18B, shown in FIG. 9, is constructed and arranged for the purpose of keeping all foreign material 2 out of the seed trench 4. The cover 30 and/or the firmer 18 structure may push or sweep loose soil and residue 2 away from the seed trench 4. It is understood that in use, moving foreign material 2 away from the trench 4 allows for only the soil forming the trench 4 to surround the seed when the closing discs 14 pinch the seed trench 4 closed.

In some implementations, the cover 30 incorporates one or more riders 34 and/or articulated joints 36 (also referred to herein as a hinge 36). The riders 34 and articulated joints 36 are constructed and arranged such that the cover 30 can adjust along with the contours of the ground. Movement of the cover 30 may be desirable such that the outer edges of the cover 30 or rider elements 34 would ride along the surface of the ground.

The articulated joints 36 may be designed such that the upward force of the cover 30 or rider 34 does not exceed the downward force of the firmer mounting arm 32. This configuration may prevent the firmer 18 from pushing up and out of the seed trench 4.

In alternate implementations, the cover 30 can be constructed and arranged so as to be directly engaged with the ground. In these and other implementations, articulated joints 36 flex to the planting depth. It is understood that the articulated joints 36 are necessarily constructed and arranged such that any force exerted by the articulated joints 36 is less than the force holding the firmer 18 in the trench 4, such that the articulated joints 36 do not push the firmer 18 up and out of the bottom of the trench 4.

In various alternative implementations, the size of the firmer 18 is increased in length and width such that the entire open seed trench 4 between the rear of the opening disks 20 and the closing discs 14 is filled by the firmer 18, as shown in FIG. 9. Further shapes and sizes are of course possible.

In some implementations, the cross-sectional shape of the firmer 18 may be configured such that the firmer 18 occupies more of the seed trench 4 to prevent ingress of residue 2 and loose soil. The firmer 18 may be comprised of a series of links 18A, 18B with hinges 38 between the links 18A, 18B. The hinge(s) 38 are constructed such that the firmer unit 18 can flex vertically and/or horizontally. A flexible firmer 18 may be needed to ensure that the firmer 18 remains in the seed trench 4, does not break, does not cause damage to the seed trench 4, and/or does not otherwise disrupt the proper placement of the seed.

In certain implementations, the firmer 18 may push or sweep loose soil and residue up and away from the seed trench such that only the soil forming the trench 4 surrounds the seed when the closing discs 14 pinch the seed trench 4 closed.

In various implementations, the firmer 18 as described in relation to FIGS. 7-8 may be used in combination with the devices and methods described above in relation to FIGS. 9 and 10. Additionally, implementations including shield elements 28—such as a firmer 18 and/or cover 30—can be combined with the adjustable row cleaner 12, discussed above in relation to FIGS. 5-6E.

Figure 10:
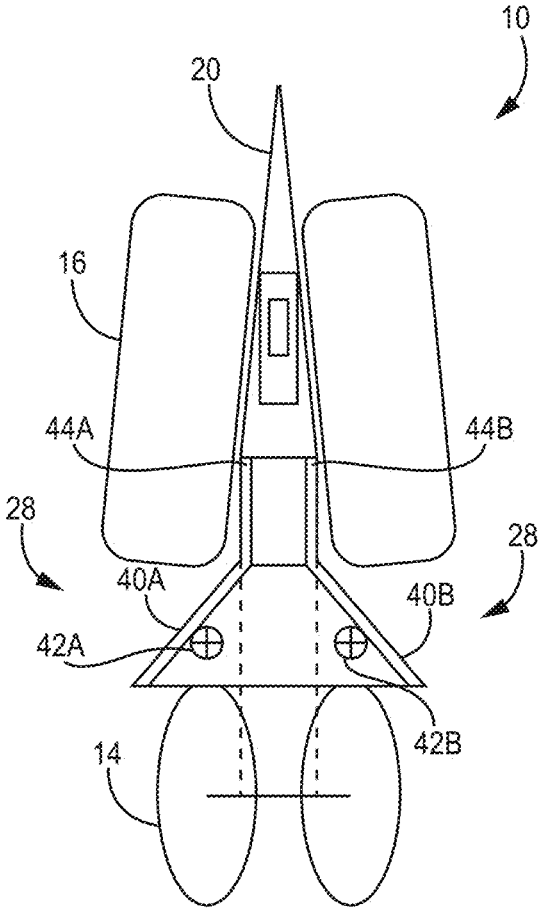
FIG. 10 is a top view of a planter row unit, according to one implementation.
Figure 11:
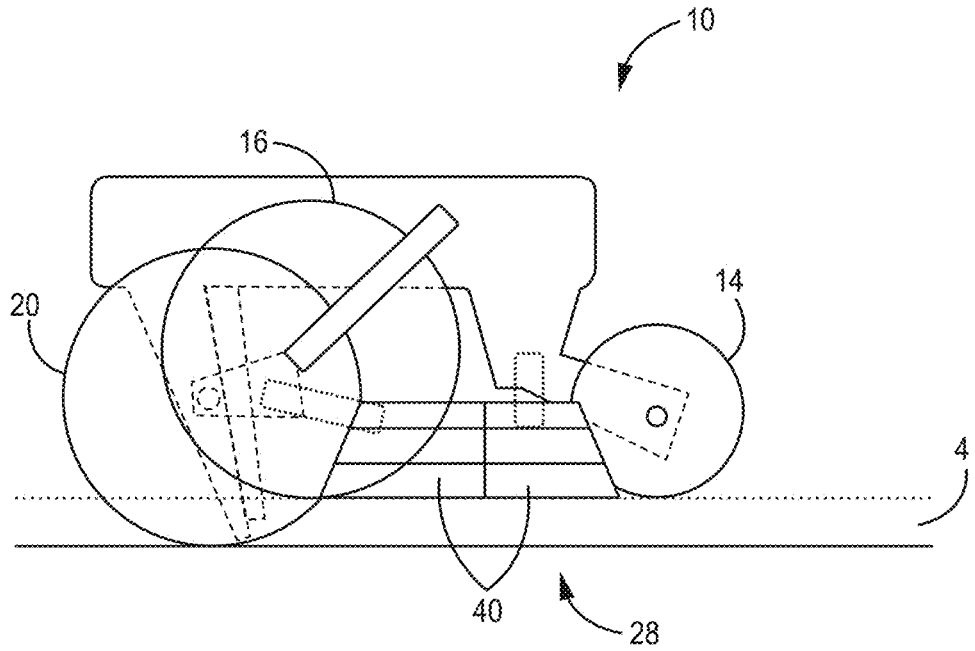
FIG. 11 is a side view of a planter row unit, according to one implementation.
Figure 12:
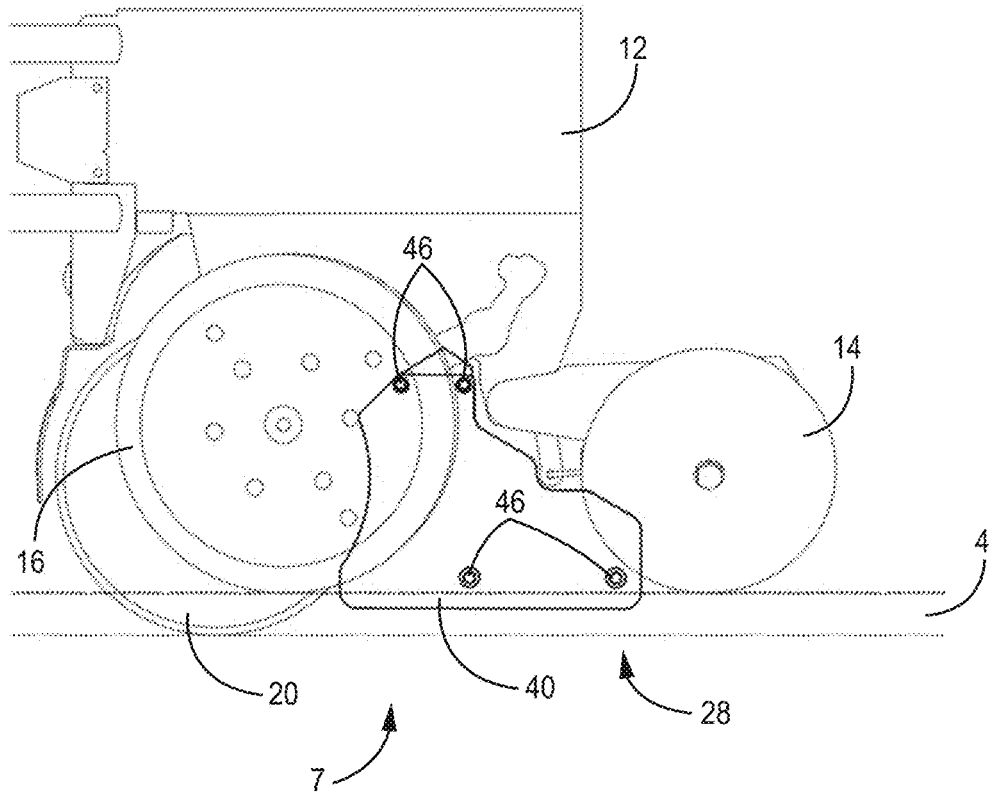
FIG. 12 is a side view of a planter row unit, according to one implementation.
Figure 13:
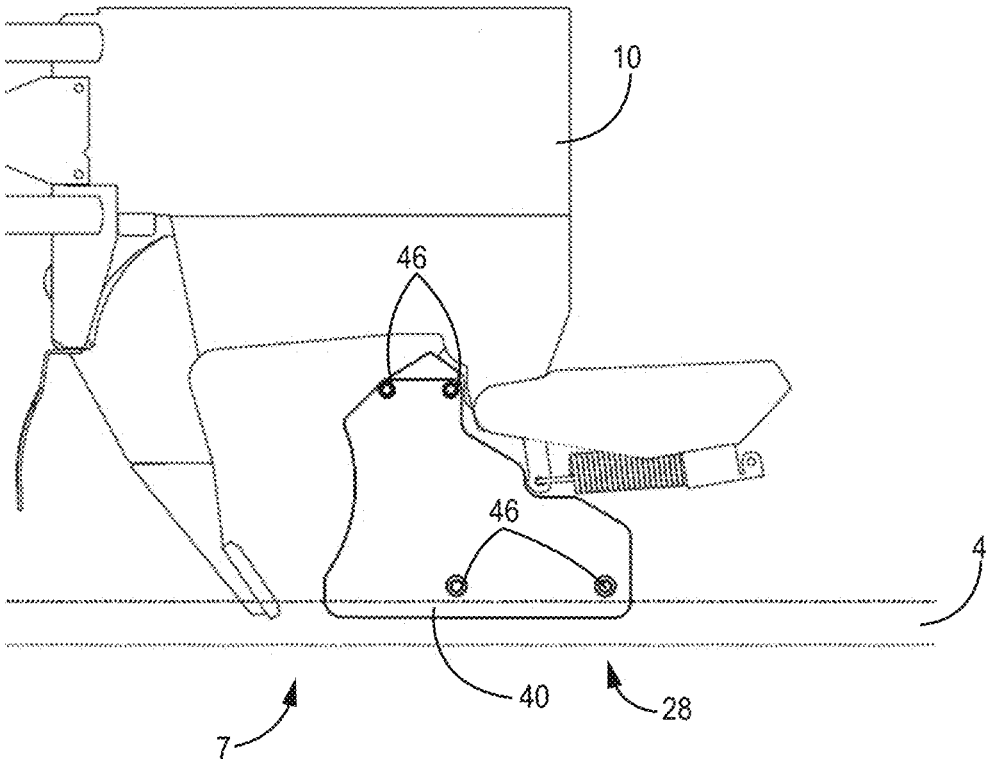
FIG. 13 is a side view of a planter row unit, according to one implementation.
Figure 14:
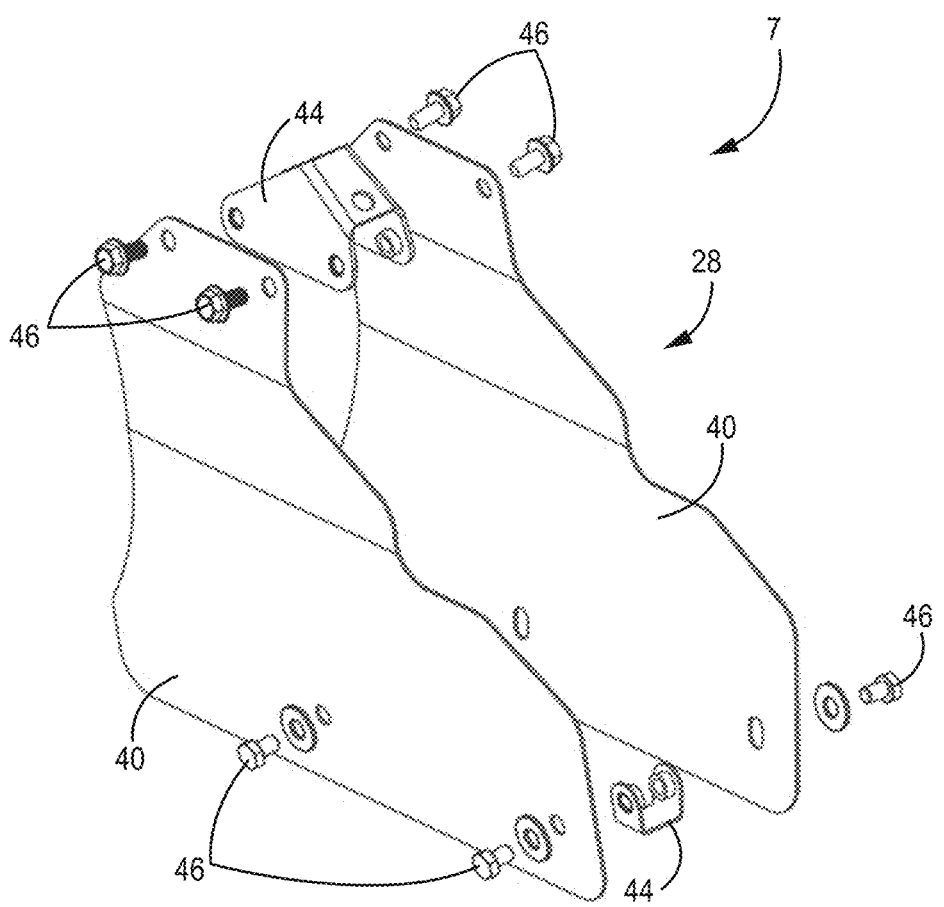
FIG. 14 is a perspective view of a shield, according to one implementation.
Figure 15:
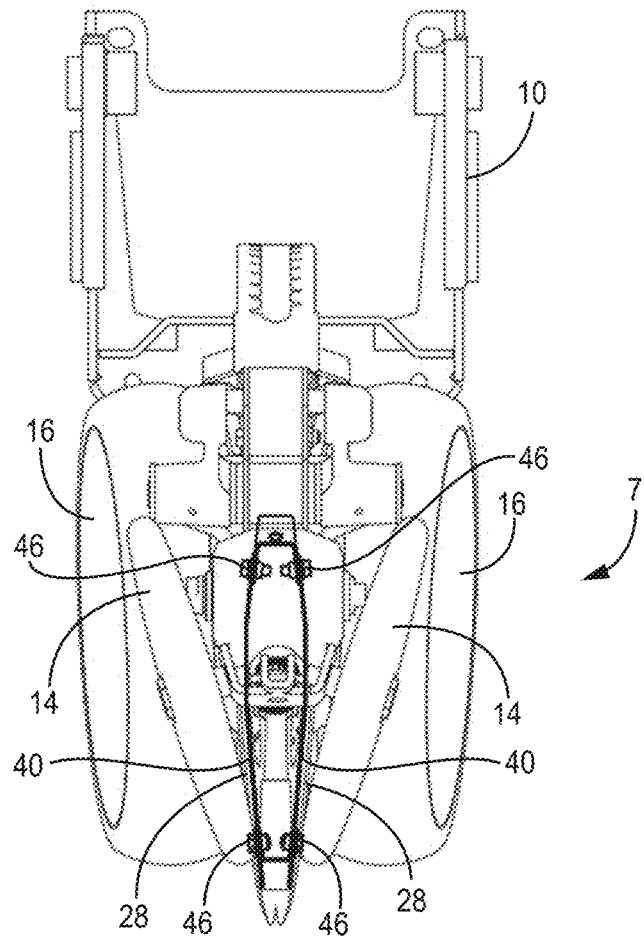
FIG. 15 is a rear view of a planter row unit, according to one implementation.

In some implementations, a shield 28 may be mounted to the planter row unit 12 and comprise one or more guard members 40A, 40B that extend rearward from inside of or near the rear of the opening discs 20—where the seed trench 4 is created—shown in FIGS. 10 and 11. The guard members 40A, 40B may extend at an outward angle from the seed trench 4 in the space between the gauge wheels 16 and closing discs 14. In certain of these implementations, the outward angle allows the guard members 40A, 40B to block and deflect loose soil and crop residue 2 picked up by the gauge wheels 16 and project such residue 2 rearward and away from the seed trench 4.

The guard members 40A, 40B, according to these implementations, deflect the residue 2 away from the open seed trench 4 and closing discs 14 such that residue 2 in the seed trench 4 and on top of the seed trench 4 is minimized. In various implementations, the guard members 40A, 40B may include slots, mounting holes, and mounting brackets for the purpose of mounting sensors 42A, 42B. In various implementations the sensors 42A, 42B may be sensors for measuring soil height (trench depth) and/or other soil characteristics as would be appreciated by those of skill in the art.

In various implementations, the guard members 40A, 40B may be linked to or otherwise in mechanical communication with one or more gauge wheel supports 44A, 44B. By linking the guard members 40A, 40B to the gauge wheel supports 44A, 44B the position and spacing of the guard members 40A, 40B with the gauge wheels 16 can be kept constant, as would be readily appreciated.

In some implementations, the guard members 40A, 40B may constructed out of flexible materials, such as bristles or canvas or other material that flexes and/or bounces back if hit by rocks, large clods, or other large, heavy field debris. Constructing guard members 40A, 40B out of flexible materials can also increase the durability of the guard members 40A, 40B such that they need to be replaced or repaired less frequently.

As shown in FIGS. 12-15, the shield 28 and guard members 40 may include a break-away system 7 where the bolts 46 and/or brackets 44 that attach the shield 28 to the row unit 10 allow the shield 28 to break away from the row unit 10 when the shield 28 strikes an immovable object, such as a rock. The break-away system 7 may be designed such that one end of the shield 28 will break away while a second end of the shield 28 remains attached preventing the shield 28 from being becoming completely detached from the row unit 10 and being lost in a field during planting.

The brackets 44 and/or bolts 46 may be disposed at various attachment points along the guard member 40 and/or shield 28. In various implementations, one or more bolts 46 are disposed at the top of the shield 28 proximal to the gauge wheel 16. Additional bolts 46 and/or corresponding brackets 44 may be disposed at the bottom of the shield 28 proximal to the ground/trench 4.

Figure 16:
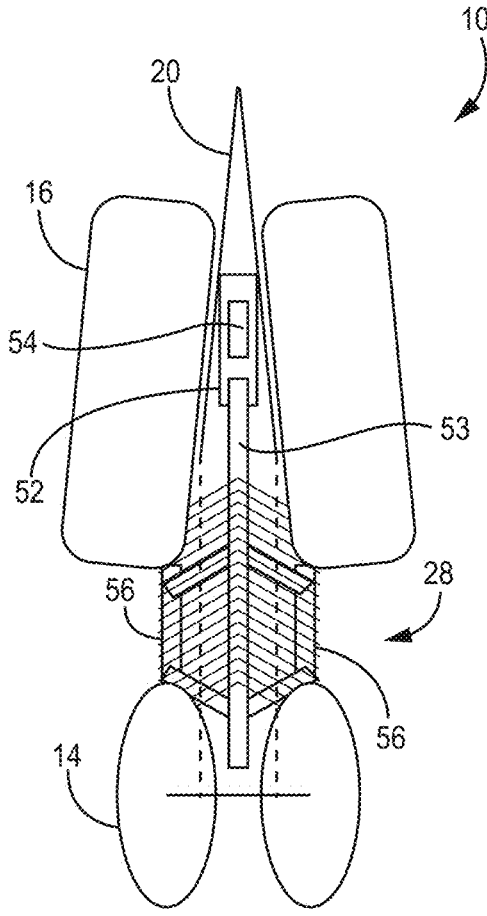
FIG. 16 is a top view of a planter row unit, according to one implementation.
Figure 17:
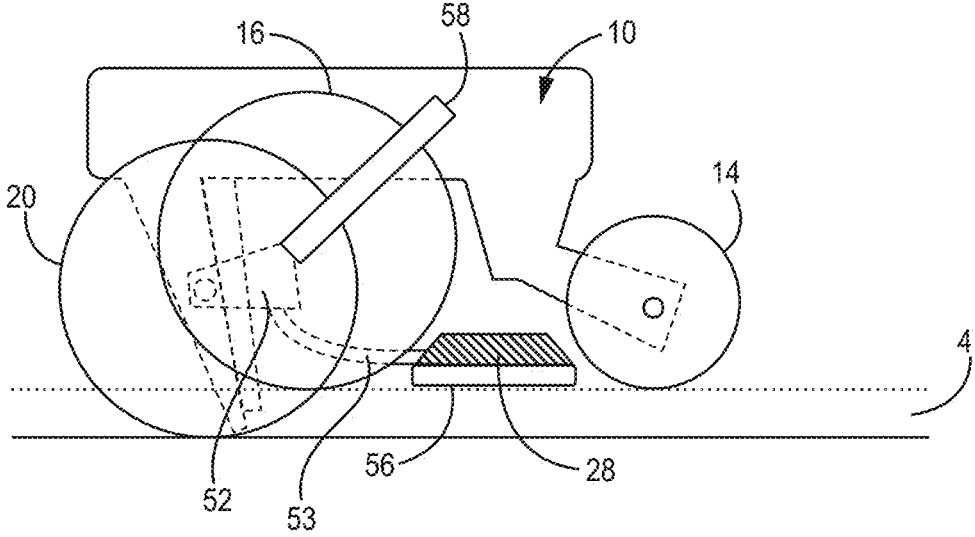
FIG. 17 is a side view of a planter row unit, according to one implementation.

In the implementations of FIGS. 16 and 17, the shield 28 is a flexible shield 28. The flexible shield 28 may be constructed an arranged such that it may expand or contract as described herein. Gauge wheels 16 move in a circular path about a pivot point on the row unit 10. When the planter 8—shown in FIG. 4—is lifted, the gauge wheel arms 58 rest against a stationary stop that defines a certain point on an arc to which the gauge wheels 16 always return when in the lifted position. When the planter 8 is lowered, gauge wheels 16 touch the ground and move up and forward. As the gauge wheels 16 move forward the gauge wheels 16 move away from closing discs 14. The gauge wheel 16 rotate forward, about an arc length until the gauge wheel arms 58 hit the depth setting stops.

In these and other implementations, as the gauge wheels 16 rotate forward, the shield 28 expands behind the gauge wheels 16. As the shield 28 expands it shelters the top of the open trench 4. When the planter is lifted, the gauge wheels 16 rotate back, towards the closing discs 14, pushing and collapsing the shield 28—as shown in FIG. 16—to make room for the gauge wheels 16 as they rotate back. The shield 28 may be collapsible in whole or in part.

The collapsible part of the flexible shield 28 may constructed of bristles, canvas, or any other flexible material as would be appreciated by those of skill in the art. In alternative implementations, the flexible shield 28 is constructed of a rigid material and includes a spring action element or hinge to provide flexibility between expanded and collapsed positions.

In various implementations, the shield 28 may be mounted to a bracket 52 attached to the row unit 10 or seed tube 54. Alternatively, the shield 28 can be integrated with a firmer 18. The shield mount 53 may be made with a resilient material having a downward spring force. The downward spring force keeps the shield 28 assembly engaged with the ground as the planter 8 traverses a field.

In various implementations, the shield 28 comprises skids 56 or ski-like outrigger elements 56 that will ride along the surface of the soil on each side of the seed trench 4. The skids 56 will allow the shield 28 to follow the contours of the ground while maintaining protection over the open seed trench 4. The skids 56 may be of various shapes and sizes and extend beyond the ground contact area of the closing discs 14.

Figure 18:
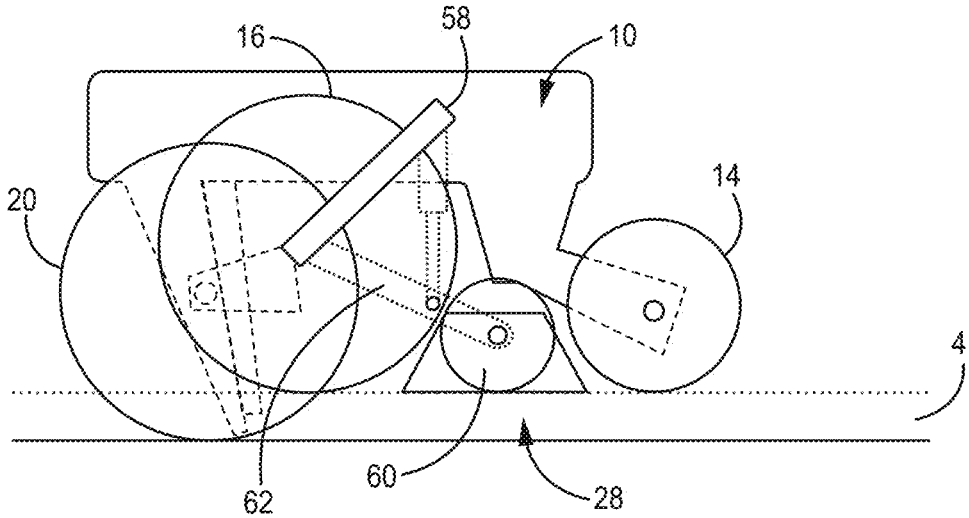
FIG. 18 is a side view of a planter row unit, according to one implementation.

As shown in FIG. 18, in an alternative implementation, the shield 28 may comprise a roller 60. The roller 60 may be placed on each side of the seed trench 4 behind the gauge wheels 16. The roller 60 may be a wheel, or series of wheels, or a track. The roller 60 may be used alone or in conjunction with the shield 28 implementations discussed herein and/or the adjustable row cleaner 12 discussed above. The roller 60 may provide a physical barrier to prevents ingress of unwanted residue 2 that can negatively impact the germination and growth of the seed and subsequent plants.

The roller 60, in various implementations, may be linked to one or more gauge wheel support members 44. The linkage of the roller 60 to the gauge wheel support member 44 allows for maintaining constant position and spacing with the gauge wheels 16 and roller 60. In some implementations, the gauge wheel arm 58 may limit the travel of the roller 60 to keep the roller 60 in the proper position.

In various implementations, the roller 60 may be similarly linked to the closing discs 14 to maintain proper position in relation to the ground.

Figure 19:
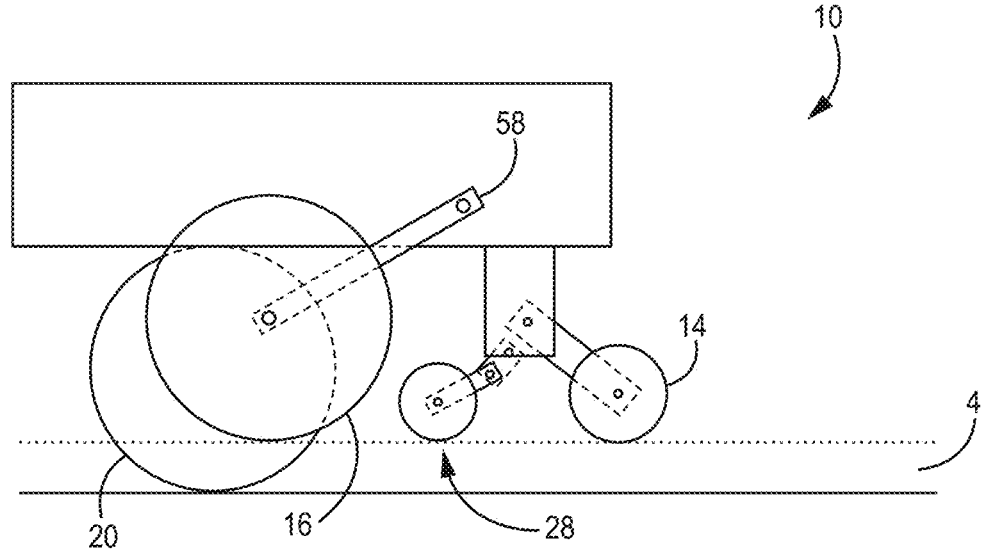
FIG. 19 is a side view of a planter row unit, according to one implementation.
Figure 20:
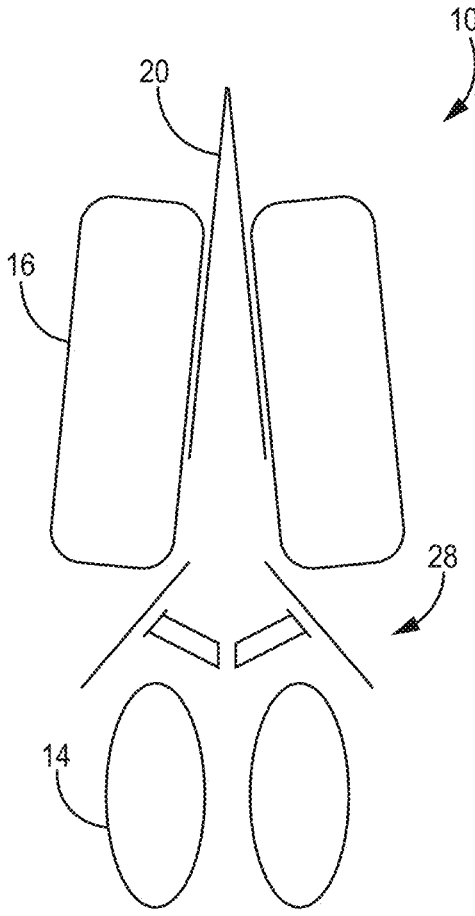
FIG. 20 is a top view of a planter row unit, according to one implementation.

In some implementations, as shown in FIGS. 19 and 20, the shield 28, is a rolling shield 28. The rolling shield 28 may consist of two shields 28, disposed on each side of the row unit 10 between each gauge wheels 16 and closing wheel 14. The shield 28 may be constructed to float/roll on the soil surface on each side of the open trench 4. The rolling shield 28 may be a straight, concave or convex shaped disk blade. In some implementations, the rolling shield 28 may include spikes or teeth along its perimeter—similar to the tines 24 of the row cleaner 12 shown in FIGS. 6A and 6B.

The rolling shield 28 may include a depth band—similar to that shown in FIG. 6B as discussed above in relation to the row cleaner wheels 22, 22A, 22B. The rolling shield 28 may be adjustable—as discussed above in relation to the row cleaner 12 in FIGS. 6A-6E.

The rolling shield 28 may rake or throw any crop residue 2 away from or outside of the closing discs 14, thereby preventing residue 2 from passing between closing discs 14. The rolling shield 28 may also shield airborne crop residue 2 from falling into the open trench 4.

The rolling shield 28 may be disposed at an angle, away from the closing discs 14, such that residue 2 cleared by the rolling shield 28 is thrown away from or outside of the closing discs 14, as best shown in FIG. 20.

In some implementations, the rolling shield 28 may be mounted directly to the row unit 10. As the planting depth settings change and/or the soil surface terrain changes, the row unit 10 moves relative to the soil surface. When the shield 28 is mounted directly to the row unit, the shield 28 may roll along on the soil surface to accommodate the row unit 10 movement.

In various implementations, the weight of the shield 28 can keep the rolling shield 28 engaged with the soil surface. In alternative implementations, an adjustable spring force between the row unit 10 and shield 28 can be used to apply downward pressure on the soil in excess of the force from the weight of the shield 28 alone. In various implementations, the shield 28 comprises two shields 28 disposed on either side of the row unit, that may move independently of each other.

Although this disclosure has been described with references to various implementation, persons skilled in the art will recognized that changes may be made in form and detail without departing from the spirit and scope of this disclosure.

The invention claimed is:

1. An agricultural row cleaner, comprising:
  (a) a pair of row cleaner wheels, each of the row cleaner wheels comprise tines and wherein the tines are retractable and extendable;
  (b) an actuator in communication with the pair of row cleaner wheels; and
  (c) at least one controller in communication with the actuator,
  wherein the row cleaner is adjustable on-the-go via the actuator to adjust at least one of tilt angle, pitch angle, wheel depth, and wheel shape.

2. The row cleaner of claim 1, wherein adjustments to the row cleaner are automatic.

3. The row cleaner of claim 1, wherein the tines are automatically retractable and extendable.

4. The row cleaner of claim 1, wherein the row cleaner adjusts based on feedback from sensors configure to detect at least one of vehicle speed, crop residue quantity, cleaner wheel RPM, and soil type.

5. The row cleaner of claim 1, wherein the at least one controller executes a closed loop feedback system, wherein one or more sensors sense one or more of vehicle speed, crop residue quantity, row cleaner wheel RPM, soil type, soil flow, soil spread, and amount of residue being moved, wherein the at least one controller assesses inputs from the one or more sensors, and wherein the at least one controller outputs a signal to the actuator to dynamically adjust the row cleaner based on sensed conditions.

6. The row cleaner of claim 5, wherein the one or more sensors comprise one or more of a vision system, radar sensors, laser imaging sensors, ultrasound sensors, and contact sensors.

7. The row cleaner of claim 5, wherein the one or more sensors comprise a GPS, vehicle speedometer, and ground engaging sensors.

8. The row cleaner of claim 1, wherein adjustments to the row cleaner are manual.

9. An agricultural row unit comprising:
  (a) a row cleaner comprising a pair of wheels;
  (b) a row cleaner adjustment system comprising at least one actuator in communication with the pair of wheels;
  (c) a controller in communication with the row cleaner adjustment system; and
  (d) at least one sensor in communication with the controller configured to measure a residue condition,
  wherein the controller assesses signals from the at least one sensor and sends a corresponding signal to the row cleaner adjustment system to adjust a component of the row cleaner.

10. The agricultural row unit of claim 9, wherein the pair of wheels comprise adjustable tines, wherein the adjustable tines are adjustable via the adjustment system.

11. The agricultural row unit of claim 9, wherein the pair of wheels comprise an adjustable depth band, wherein the adjustable depth band is adjustable via the adjustment system.

12. The agricultural row unit of claim 9, wherein a tilt angle of the pair of wheels is adjustable via the adjustment system.

13. The agricultural row unit of claim 9, wherein a pitch angle of the pair of wheels is adjustable via the adjustment system.

14. The agricultural row unit of claim 13, wherein the pitch angle of the pair of wheels is decreased as travel speed increases.

15. The agricultural row unit of claim 9, wherein the depth of the row cleaner is adjustable via the adjustment system.

16. The agricultural row unit of claim 15, wherein the depth of the row cleaner is increased when the at least one sensor senses an increase in residue quantity.

17. A method for adjusting a row cleaner comprising:
  sensing a crop condition;
  detecting a vehicle condition;
  transmitting signals to a controller of sensed crop and vehicle conditions;
  assessing the signals by the controller;
  transmitting an adjustment signal to an adjustment system in communication with a row cleaner; and
  adjusting the row cleaner via the adjustment system,
  wherein the crop condition comprises one or more of soil type, soil flow, soil spread, residue type, and residue movement, and
  wherein the vehicle condition comprises one or more of vehicle speed and row cleaner status.

18. The method of claim 17, further comprising extending or retracting tines on one or more row cleaner wheels of the row cleaner.

* * * * *